(12) United States Patent (10) Patent No.: US 7,937,337 B2
Lee et al. (45) Date of Patent: May 3, 2011

(54) SYSTEM AND METHOD FOR GENERATING ROBOT GENOME

(75) Inventors: Kang-Hee Lee, Seoul (KR);
Kwang-Choon Kim, Suwon-si (KR);
Jong-Hwan Kim, Daejeon (KR)

(73) Assignee: Samsung Electronics Co., Ltd (KR)

( * ) Notice: Subject to any disclaimer, the term of this patent is extended or adjusted under 35 U.S.C. 154(b) by 801 days.

(21) Appl. No.: 11/851,175

(22) Filed: Sep. 6, 2007

(65) Prior Publication Data

US 2008/0306627 A1 Dec. 11, 2008

(30) Foreign Application Priority Data

Sep. 6, 2006 (KR) ........................ 10-2006-0085570

(51) Int. Cl.
*G06F 15/18* (2006.01)
(52) U.S. Cl. ............................... 706/12; 706/13; 706/14
(58) Field of Classification Search ........................ None
See application file for complete search history.

(56) References Cited

U.S. PATENT DOCUMENTS

| 6,064,996 A * | 5/2000 | Yamaguchi et al. ............ 706/13 |
| 6,324,529 B1 * | 11/2001 | Kamihira et al. ............... 706/13 |
| 6,324,530 B1 * | 11/2001 | Yamaguchi et al. ............ 706/13 |
| 7,493,295 B2 * | 2/2009 | Ayala ............................. 706/26 |
| 2004/0148268 A1 * | 7/2004 | Reil ............................... 706/904 |
| 2005/0251291 A1 * | 11/2005 | Solomon ....................... 700/245 |

FOREIGN PATENT DOCUMENTS

| JP | 2004-066367 | 3/2004 |
| KR | 1020060026297 | 3/2006 |

OTHER PUBLICATIONS

Jong-Hwan et al. "Ubiquitous Robot: The Third Generation of Robotics" AUS-ISM, 2005, pp. 1-8.*
Jong-Hwan et al. "The Origin of Artificial Species: Genetic Robot", International Journal of Control, 2005, pp. 564-570.*
Jong-Hwan et al. "The Origing of Artificial Species: Humanoid Robot HanSaRam", HNICEM05, 2005, pp. 1-11.*
www.en.wikipedia.org/wiki/Genetic_algorithm, Aug. 2006 as retrieved from www.web.archive.org, pp. 1-12.*
www.en.wikipedia.org/wiki/Crossover_(genetic_algorithm), Sep. 2004, as retrieved from www.web.archive.org, pp. 1-4.*
Jong-Hwan et al., "Genetic Representation for Evolvable Artificial Creature", IEEE, 2006, pp. 6838-6843.*

* cited by examiner

*Primary Examiner* — Omar F Fernandez Rivas
(74) *Attorney, Agent, or Firm* — The Farrell Law Firm, P.C.

(57) ABSTRACT

A system and method for generating a robot genome. Internal state attribute preferences of internal states and behavior preferences are input by a user, and a set of one or more robot genomes containing initial values of genes is generated. A masking process of each robot genome of the generated robot genome group is performed so attributes are manifested. Robot genomes that underwent the masking process are loaded into a personality engine. A reliability value is calculated from a manifestation result of each robot genome, and reliability values of extracted robot genomes that satisfy a particular user reliability value are determined. Extracted robot genomes are modified when the user reliability value is not satisfied, and a new robot genome group including the modified robot genomes is generated. A robot genome satisfying the user reliability is extracted by iteratively performing the above procedures for the newly generated robot genome group.

32 Claims, 16 Drawing Sheets

FIG. 4

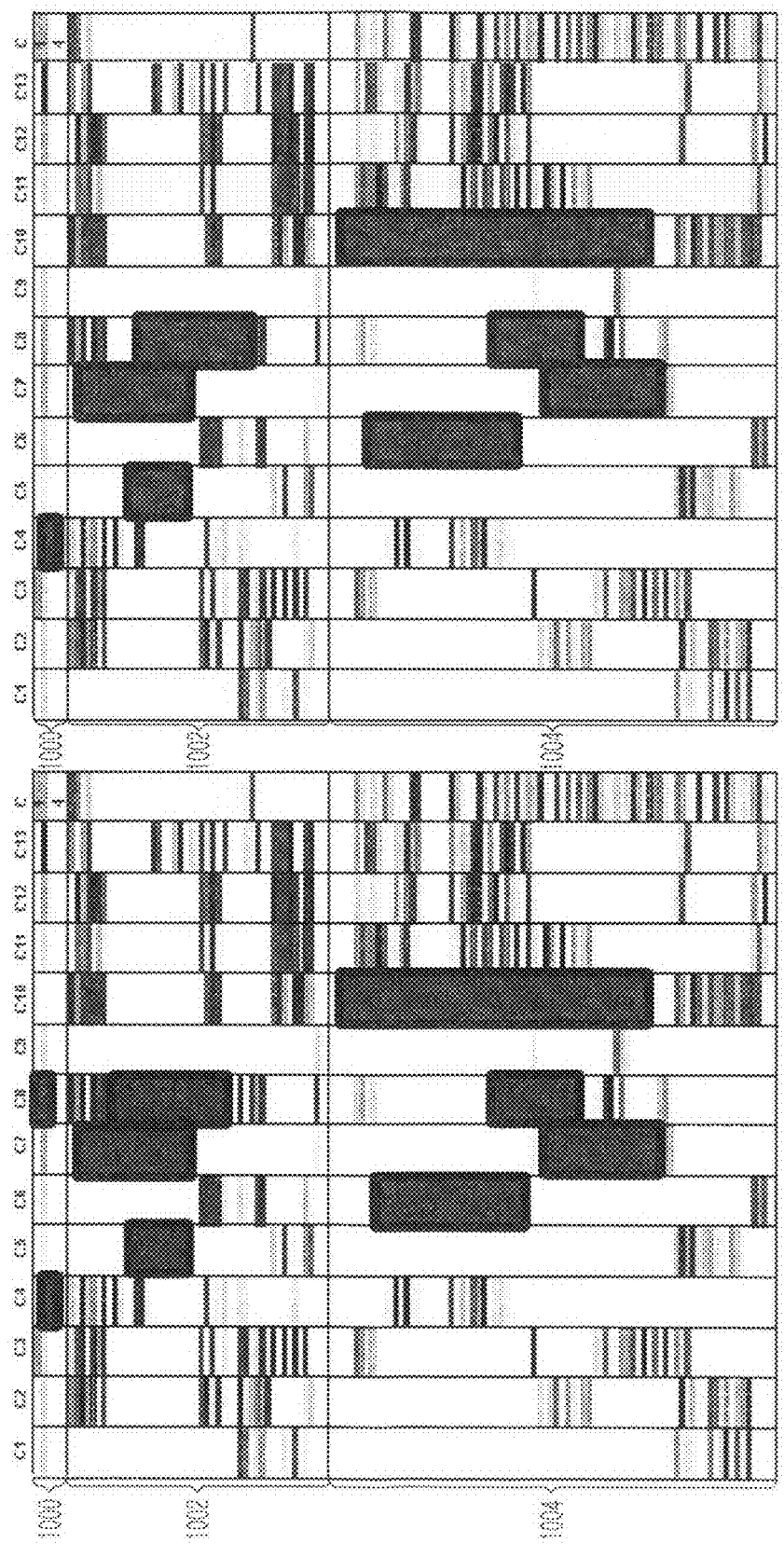

SYSTEM AND METHOD FOR GENERATING ROBOT GENOME

PRIORITY

This application claims priority under 35 U.S.C. §119(a) to a Patent Application filed in the Korean Intellectual Property Office on Sep. 6, 2006 and assigned Serial No. 2006-85570, the contents of which are incorporated herein by reference.

BACKGROUND OF THE INVENTION

1. Field of the Invention

The present invention generally relates to a genetic robot, and in particular, to a system and method for generating a genetic code of a genetic robot according to a user input.

2. Description of the Related Art

In general, the phrase 'genetic robot' refers to an artificial creature, a software robot (Sobot), or a general robot having a unique genetic code. A robot genetic code generally refers to a single robot genome composed of a plurality of artificial chromosomes. A Sobot generally refers to a software artificial creature which can interact with a user as an independent software agent or operate as an intelligent unit of a hardware robot, which links a sensor network and the hardware robot, while moving across networks.

A plurality of artificial chromosomes embodied in a robot genome define transition between internal states of the robot, such as motivation, homeostasis, and emotion, and a personality of the robot deciding behavior of the robot aroused by the transition, while interacting with the environment external to the robot. The definition of artificial creature, personality, motivation, homeostasis, emotion, and behavior is shown in Table 1.

TABLE 1

| | |
|---|---|
| Artificial creature | Artificial handwork, which acts according to self-motivation, has emotion, interacts with a human being in real-time, and selects behavior. |
| Personality | Not description obtained by simply summarizing behavior but a determiner of a partial or entire portion. It can be analyzed as human personality. Concept including motivation, homeostasis, and emotion. That is, a personality engine means an engine having motivation, homeostasis, and emotion. Determiner generating various types of internal states and behaviors. |
| Motivation | Process of arousing and maintaining behaviors of an organism and controlling a pattern of the behaviors. Reason for selecting and performing behavior, e.g., curiosity, intimacy, monotony, avoidance, greed, the desire to control, etc. |
| Homeostasis | Function of maintaining a physiological state as an individual in a stable state even when an organism continuously suffers a change of an external and internal environment. Reason for selecting and performing behavior, e.g., hunger, drowsiness, fatigue, etc. |

TABLE 1-continued

| | |
|---|---|
| Emotion | Subjective restlessness occurring when an organism performs a certain behavior. For example, happiness, sadness, anger, fear, etc. |
| Behavior | Generic term indicating that an individual moves to a specific point or stops. Sleeping, eating, and running are examples in the case of an animal. The number of behaviors, which can be selected by an individual, is finite, and each individual can perform only one behavior at a certain time. |

Artificial chromosomes can be classified into essential element related genes, internal state related genes, and behavior decision related genes. Essential element related genes are essential parameters significantly affecting an internal state change and an outwardly manifested behavior, internal state related genes are parameters affecting internal states of a robot in associated with an external input applied to the robot, and behavior decision related genes are parameters used to decide an outwardly manifested behavior according to currently determined internal states.

Internal states include states of motivation, homeostasis, emotion, etc. That is, internal states of a robot can be determined by internal states and parameters of internal states according to external stimuli, i.e. internal state related genes, as shown in Table 2.

TABLE 2

| External stimulus | Internal state | | | | | |
|---|---|---|---|---|---|---|
| | Motivation | | Homeostasis | | Emotion | |
| | Intimacy ... | Hostility | Hunger ... | Drowsiness | Happiness ... | Sadness |
| Patting | 80 ... | −40 | 0 ... | 0 | 40 ... | −20 |
| Hitting | −30 ... | 50 | 0 ... | 0 | −30 ... | 30 |
| Surprising | 0 ... | 5 | 0 ... | 0 | 10 ... | 0 |
| ... | ... ... | ... | ... ... | ... | ... ... | ... |
| Soothing | 40 ... | −40 | 0 ... | 0 | 50 ... | −50 |

Behavior decision related genes can be determined as well, except that external stimuli are replaced with various behaviors. That is, for behavior decision related genes, various parameters corresponding to specific behaviors are contained for each internal state. For example, when essential element related genes are composed of volatility, initial value, mean value, convergence value, temporal decay value, and specific value specified by a specific time, as essential parameters significantly affecting an internal state change and an outwardly manifested behavior, the essential element related genes can contain volatility, initial value, mean value, convergence value, decay value, and specific value according to internal states of motivation, homeostasis, and emotion. As described above, a robot genome includes essential element related genes composed of parameters of internal states and elements essential to an internal state change and an outwardly manifested behavior corresponding to each internal state, internal state related genes composed of parameters of various external stimuli and internal states corresponding to each external stimulus, and behavior decision related genes composed of parameters of various manifested behaviors and internal states corresponding to each manifested behavior. That is, a robot genome can be represented by a two dimensional matrix of the internal states, and essential elements, external stimuli, and manifested behaviors corresponding to each internal state, as shown in Table 3.

TABLE 3

|  |  | Motivation | | Homeostasis | | Emotion | |
| --- | --- | --- | --- | --- | --- | --- | --- |
|  |  | Intimacy ... | Hostility | Hunger ... | Drowsiness | Happiness ... | Sadness |
| Essential element | Volatility Initial value ... Decay value | Essential element related genes (motivation) | | Essential element related genes (homeostasis) | | Essential element related genes (emotion) | |
| External stimulus | Patting Hitting ... Soothing | Internal state related genes (motivation) | | Internal state related genes (homeostasis) | | Internal state related genes (emotion) | |
| Manifested behavior | Smiling Looking around ... Rolling | Behavior decision related genes (motivation) | | Behavior decision related genes (homeostasis) | | Behavior decision related genes (emotion) | |

Thus, as the number of attributes of each internal state is larger, and as the number of external stimuli, behavior decisions, and essential elements is larger, a robot can have a larger number of genes, representing a larger variety of behaviors. However, a user directly inputs parameters of these genes. For example, if the number of internal state attributes is 14, the number of essential elements is 5, the number of external stimuli is 47, and the number of manifested behaviors is 77, the number of parameters that are input by the user, i.e. the number of genes, reaches 70 (5×14) essential element related genes, 658 (47×14) internal state related genes, and 1078 (77×14) behavior decision related genes, i.e. a total of 1806 (=70+658+1078). Thus, in this case, it is difficult for the user to directly input this number of parameters.

In addition, even if the user directly inputs the parameters, the user has no way to determine whether a personality of the robot manifested according to the parameters input by the user is desired by the user. That is, the user cannot know a personality of the robot before the personality is manifested, and even if the personality is manifested, the user has no way to test whether the robot has a personality desired by the user.

In order to address these problems, robots are currently available by setting all genes as a uniform value so each robot can have a personality desired by a user through interacting with and learning from the user (the former). Alternatively, robot personality models may be pre-made so each user can select one of various pre-made personality models for his/her robot (the latter). The former has a problem because of the length of time needed to make a robot learn a personality desired by a user, and the latter has a problem because robots having the same personality model have the same personality even when a personality model is verified and that specific personality is manifested, since the personality of each robot cannot be specified according to a user. That is, existing robot genome generation methods cannot solve conventional problems occurring when a robot genome is generated.

SUMMARY OF THE INVENTION

The present invention substantially solves at least the above problems and/or disadvantages and provides at least the advantages below. Accordingly, an aspect of the present invention is to provide a system and method for generating robot genome, whereby a robot having the personality desired by a user can be revealed when robot genome of a genetic robot is generated.

Another aspect of the present invention is to provide a system and method for generating robot genome, whereby robot genome of a genetic robot for manifesting the personality desired by a user can be easily generated when the robot genome is generated.

According to an aspect of the present invention, there is provided a system for generating robot genome, the system including a user preference input unit for receiving user preferences from a user, the user preferences including internal state attribute preferences of internal state attributes according to external stimuli and behavior preferences distinguished according to the internal state attributes; an initial value generator for generating a robot genome group including a plurality of robot genomes containing initial values of internal state related genes generated by reflecting the internal state attribute preferences, initial values of behavior decision related genes generated by reflecting the behavior preferences, and initial values of essential element related genes determined according to conditions; a masking unit for performing a masking process of determining internal state related genes and behavior decision related genes manifested with respect to external stimuli and manifested behaviors from among the genes by applying a masking table to each of the plurality of robot genomes, and determining whether manifestation attributes of genes determined to manifest are positive or negative; a manifestation unit for manifesting each of the robot genomes according to a stimulus scenario for testing whether the robot genomes are suitable for the user preferences, and performing processing of manifestation results according to the stimulus scenario; a suitability determiner for receiving the manifestation results according to the stimulus scenario, determining a reliability value of each robot genome, and determining whether reliability values of according to manifestation results of robot genomes extracted from the robot genome group are suitable for the user preferences; a modification unit for modifying the input robot genomes according to a modification method when the extracted robot genomes are input; and a controller for determining according to a determination result of the suitability determiner whether the extracted robot genomes are modified or one of the extracted robot genomes is output, and when the extracted robot genomes are determined to be modified, controlling the modification unit to modify the extracted robot genomes, controlling the initial value generator to generate a new robot genome group including a plurality of new robot genomes in which the internal state attribute preferences and the behavior preferences are reflected and the modified robot genomes, controlling the masking unit and the manifestation unit to perform the masking process and the manifestation process for the new robot genome group again, and transmitting robot genomes according to a re-performing result of the manifestation process to the suitability determiner.

According to another aspect of the present invention, there is provided a method of generating robot genome, the method including a user preference receiving process, wherein user preferences are received form a user, the user preferences including internal state attribute preferences of internal state attributes according to external stimuli and behavior preferences distinguished according to the internal state attributes; a robot genome group generating process, wherein a robot genome group is generated, the robot genome group including a plurality of robot genomes containing initial values of internal state related genes generated by reflecting the internal state attribute preferences, initial values of behavior decision related genes generated by reflecting the behavior preferences, and initial values of essential element related genes determined according to conditions; a masking process, wherein internal state related genes and behavior decision related genes manifested with respect to external stimuli and manifested behaviors are determined from among the genes by applying a masking table to each of the plurality of robot genomes, and a determination is made whether manifestation attributes of the genes determined to manifest are positive or negative; a manifesting process, wherein each of the robot genomes is manifested according to a stimulus scenario for testing whether the robot genomes are suitable for the input user preferences, and manifestation results of the robot genomes according to the stimulus scenario are output; a suitability determining process, wherein a reliability value of each robot genome is determined by receiving the manifestation results according to the stimulus scenario and the robot genomes, and a determination result is obtained regarding whether reliability values of robot genomes extracted from the robot genome group are suitable for the user preferences; a modifying process, wherein the extracted robot genomes are modified according to a modification method when the reliability values of the extracted robot genomes are not suitable for the user preferences according to a determination result in the suitability determining process; a secondary robot genome group generating process, wherein a new robot genome group is generated, which includes a plurality of new robot genomes in which the internal state attribute preferences and the behavior preferences are reflected and the modified robot genomes; and an iterating process, wherein the masking process, the manifesting process, and the suitability determining process are iteratively performed for the secondary robot genome group, and according to a result in the suitability determining process, the modifying process and the secondary robot genome group generating process are iteratively performed.

BRIEF DESCRIPTION OF THE DRAWINGS

The above and other objects, features and advantages of the present invention will become more apparent from the following detailed description when taken in conjunction with the accompanying drawing in which:

FIG. 4 illustrates a GUI screen through which a user can input a preference value of each gene in a robot genome generation system according to the present invention;

FIGS. 10A and 10B illustrate an independent crossover calculation method among the robot genome modification methods available in a robot genome generation system according to the present invention;

DETAILED DESCRIPTION OF THE PREFERRED EMBODIMENTS

Figure 1:
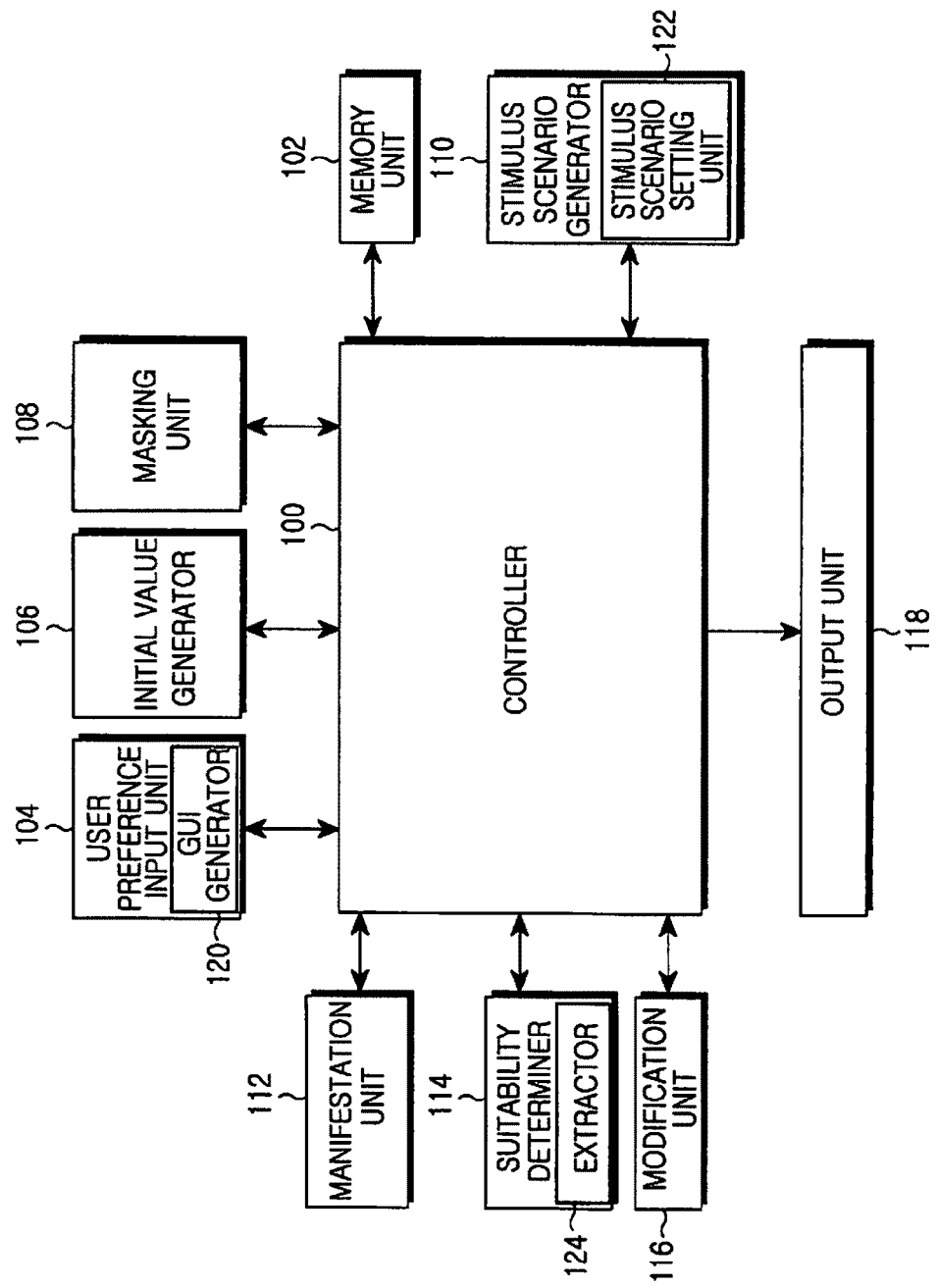
FIG. 1 is a block diagram of a robot genome generation system according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

In order to help the full understanding of the present invention, the basic principle of the present invention will now be described. Internal state attribute preferences of internal states and behavior preferences classified for internal state attributes are input by a user, and a set of robot genomes containing initial values of internal state related genes and behavior decision related genes generated by reflecting the user input preferences, i.e., a robot genome group, is generated using a initialization process. A masking process of each robot genome of the generated robot genome group is performed so attributes of an internal state related gene and a behavior decision related gene suitable for each internal state are manifested, and whether the attributes are positive or negative is determined. The robot genomes that underwent the masking process are manifested according to a currently set stimulus scenario. A reliability value is calculated from a manifestation result of each robot genome of the robot genome group, and whether reliability values of a portion of extracted robot genomes satisfy a user reliability value is determined. If the reliability values of the extracted robot genomes do not satisfy the user reliability value, the currently extracted robot genomes are modified, and a new robot genome group including the modified robot genomes is generated. A robot genome satisfying the user reliability is extracted by iteratively performing the above procedures for the robot genomes of the newly generated robot genome group. Accordingly, in the present invention, by receiving only the preference to internal states of each robot genome from a user, a robot genome having a personality desired by the user can be generated, and the user can rely that the currently generated robot genome has the personality desired by the user.

FIG. 1 shows a robot genome generation system according to the present invention. The robot genome generation system includes a controller 100, and a user preference input unit 104, an initial value generator 106, a masking unit 108, a stimulus scenario generator 110, a manifestation unit 112, a suitability determiner 114, a modification unit 116, and an output unit 118, which are connected to the controller 100.

The controller 100 controls each component of the robot genome generation system according to the present invention. The controller 100 controls the initial value generator 106 to generate one or a plurality of robot genomes reflecting preferences input by a user. A robot genome set having one or more robot genomes as elements is herein called a robot genome group. The controller 100 controls the masking unit 108 to perform a masking process of the robot genomes and manifests the robot genomes according to a currently set stimulus scenario. The controller 100 extracts a portion of the manifested robot genomes, and selects one of the extracted robot genomes and outputs the selected robot genome as a robot genome having personality suitable for the preference set by the user when the extracted robot genomes satisfy user reliability. However, the controller 100 modifies the extracted robot genomes and generates a new robot genome group including a number of modified robot genomes and new robot genomes when the extracted robot genomes do not satisfy the user reliability. The controller 100 manifests robot genomes of the new robot genome group according to the stimulus scenario. The controller 100 determines again whether robot genomes satisfy the user reliability.

A memory unit 102 stores programs and various types of reference data for processing and control of the controller 100. The memory unit 102 provides a working memory of the controller 100 and provides a storage area for storing various kinds of updatable storage data. In the storage area, a masking table for performing the masking process and setting information of a plurality of stimulus scenarios set by the user or pre-set can be stored. In addition, Graphic User Interface (GUI) generation data for generating a GUI by which the user can input internal state attribute preferences and behavior preferences classified for internal state attributes of each internal state related gene can be stored.

The user preference input unit 104 includes a GUI generator 120, and the controller 100 controls the user preference input unit 104 to generate and output a GUI screen so the user can input preference values per internal state attribute of internal state related genes and behavior decision related genes. The GUI screen can be variously formed, and in order to minimize the number of preference values input by the user, an input menu for inputting internal state attribute preference of each internal state related gene and an input menu for inputting behavior preference of each behavior decision related gene may be included.

In addition, the user preference input unit 104 may further include a display unit (not shown) for displaying the GUI and a user key input unit (not shown) for receiving the user's key input. However, if the robot genome generation system according to the present invention is connected to a robot platform of the user via a wireless or wired network, the user preference input unit 104 may further include a GUI output unit (not shown) for outputting data for generating the GUI screen to the robot platform instead of the display unit and a user input data receiver (not shown) for receiving a user input from the robot platform via the network instead of the user key input unit.

The initial value generator 106 calculates initial values of the internal state related genes and the behavior decision related genes by reflecting the internal state attribute preferences and the behavior preferences input from the user preference input unit 104 on currently set parameters of the internal state related genes and the behavior decision related genes using an initial value setting process. Even if the same external stimulus is added, the initial values of the internal state related genes may be calculated differently according to internal states related to the external stimulus, i.e. internal state attributes. For example, when an internal state attribute is 'intimacy', external stimuli 'hitting' and 'soothing' may be calculated in different methods. These calculation methods can be determined by values of a masking table used for the masking process. That is, the initial values of the internal state related genes can be determined as in Equation (1).

$$x_{qk}^{I0} = U[0, I_{max}]\lambda_{qk}^{I} \quad \quad 1$$

$$\lambda_{qk}^{I} = \begin{cases} \dfrac{\psi_{qk}^{I}}{\lambda_{c1}^{I}}, & \text{if } m_{qk}^{I} \geq 0 \\ \dfrac{\lambda_{c2}^{I}}{\psi_{qk}^{I}}, & \text{if } m_{qk}^{I} < 0 \end{cases}$$

$\psi_{qk}^{I}$ denotes a user preference value input with respect to a current internal state attribute, and $\lambda_{c1}^{I}$ and $\lambda_{c2}^{I}$ denote control constants to a current external stimulus. $I_{max}$ denotes the maximum value of an initial value $x_{qk}^{I0}$ of an internal state related gene according to the current internal state attribute, which can be set. In addition, $I_{max}$ can be determined by an essential element related gene. $m_{qk}^{I}$ denotes a masking table value (hereinafter, a masking value) corresponding to the external stimulus (e.g., patting) and the internal state attribute (e.g., intimacy).

Thus, when the masking value $m_{qk}^{I}$ is less than 0, the user preference value is divided by a control constant, and when the masking value $m_{qk}^{I}$ is equal to or greater than 0, a control constant is divided by the user preference value. Accordingly, when the masking value $m_{qk}^{I}$ is equal to or greater than 0, the initial value $x_{qk}^{I0}$ of an internal state related gene according to the current internal state attribute has a high probability of having a value greater than the maximum value $I_{max}$ as a result of the calculation $U[0,\lambda_{qk}^I \cdot I_{max}]$. On the other hand, when the masking value $m_{qk}^I$ is less than 0, the initial value $x_{qk}^{I0}$ of an internal state related gene according to the current internal state attribute has a high probability of having a value less than the maximum value $I_{max}$ as a result of the calculation $U[0,\lambda_{qk}^I \cdot I_{max}]$.

Thus, for internal state attributes having a higher user preference, while the probability that initial values of internal state related genes having a masking value equal to or greater than 0 become large is higher, the probability that initial values of internal state related genes having a masking value less than 0 become small is higher. On the contrary, for internal state attributes having a lower user preference, while the probability that initial values of internal state related genes having a masking value equal to or greater than 0 become small is higher, the probability that initial values of internal state related genes having a masking value less than 0 become large is higher. That is, if the user increases the preference of an internal state attribute 'intimacy', the probability that an initial value of an internal state related gene corresponding to an external stimulus 'patting' having a masking value equal to greater than 0 becomes large is higher, and the probability that an initial value of an internal state related gene corresponding to an external stimulus 'hitting' having a masking value less than 0 becomes small is higher. However, if the user decreases the preference of the internal state attribute 'intimacy', the probability that the initial value of the internal state related gene corresponding to the external stimulus 'patting' having the masking value equal to greater than 0 becomes small is higher, and the probability that the initial value of the internal state related gene corresponding to the external stimulus 'hitting' having the masking value less than 0 becomes large is higher.

Meanwhile, initial values of the behavior decision related genes can be determined after behavior decision related gene masking is applied. Since the behavior decision related genes are genes for deciding a behavior manifested according to an internal state, a masking value of each behavior decision related gene has information on whether behaviors related to each internal state are manifested. That is, if a masking value of a behavior decision related gene is 0, behaviors related to each internal state are not manifested, and if the masking value is 1, behaviors related to each internal state have the probability of being manifested. Thus, the behavior decision related genes do not have a masking value less than 0. Accordingly, the initial values of the behavior decision related genes can be determined as in Equation (2).

$$x_{rk}^{B0} = U[0, B_{max}]\lambda_{rk}^B, \, 0 < \lambda_{rk}^B \le 1 \qquad 2$$

$$\lambda_{rk}^B = \frac{\psi_{rk}^B}{\lambda_c^B}$$

$\psi_{rk}^B$ denotes a user preference value input with respect to a current internal state attribute, and $\lambda_c^B$ denotes a constant to manifestation of a current behavior. $B_{max}$ denotes the maximum value of an initial value $x_{rk}^{B0}$ of a behavior decision related gene according to the current internal state attribute, which can be set. In addition, $B_{max}$ can be determined by an essential element related gene. Thus, as the user preference value increases, the initial value $x_{rk}^{B0}$ of a behavior decision related gene determined as a result of the calculation $U[0,B_{max}]\lambda_{rk}^B$ increases. However, as the user preference value decreases, the initial value $x_{rk}^{B0}$ of a behavior decision related gene determined as a result of the calculation $U[0,B_{max}]\lambda_{rk}^B$ decreases.

As described above, since values of the essential element related genes are parameters significantly affecting the internal state related genes and manifestation of the behavior decision related genes, they may be set by a system in advance without being set by the user or arbitrarily set according to a condition (e.g., within a range between maximum and minimum values).

A single robot genome is generated by gathering the initial values of the genes. If the generation of a single robot genome is completed, the initial value generator 106 generates a plurality of robot genomes different from each other, in which user preferences are reflected, by repeating the initial value calculation process under the control of the controller 100.

The controller 100 controls the masking unit 108 to perform the masking process by receiving the robot genomes from the initial value generator 106. The masking is classified into essential element related gene masking, internal state related gene masking, and behavior decision related gene masking according to the gene types, and masking methods depend on the gene types. Masking refers to multiplication of a number +1, 0, or −1, however, in a broad sense, refers to a process of determining whether an attribute is manifested and whether the attribute is positive or negative. Masking values can be experientially set as customary values generally acknowledged by social members according to the Eliza effect or Meme Theory.

In essential element related gene masking, since the internal state attributes (e.g., intimacy, hostility, and so on) of a Sobot have a high correlation with the essential element related genes, whether a function of each element is manifested is masked by masking necessary essential elements with 1 and unnecessary elements with 0, and proper minimum and maximum values are set. By doing this, a robot genome can be modified according to the user preferences.

That is, if unnecessary gene values are masked by 1, consistency is lost, and thereby all the essential element related genes may be converged or diverged to the maximum or minimum value, resulting in making setting of the internal state related genes meaningless. For example, in the case where the user desires personality having high 'intimacy', if a gene value having information on 'temporal decay value of intimacy' among the essential element related genes is decreased, since once increased intimacy is not easily decreased, 'intimacy' can be maintained for a long time. Alternatively, if a gene value having information on 'temporal convergence value of intimacy' among the essential element related genes is increased, since a high convergence value can be obtained as time goes by, high 'intimacy' can be maintained. Consequently, if the two gene values are masked by 1, as optimization is performed, 'temporal decay value of intimacy' will be converged to the minimum value and 'temporal convergence value of intimacy' will be converged to the maximum value. Thus, in this case, the once increased intimacy never drops regardless of an arbitrary stimulus, and personality always having intimacy of the maximum value, which is far from general personality, is created. Thus, one of the two gene values is masked by 1 and the maximum or minimum value is fixed to a proper level, or one of the two gene values is masked by 0. That is, the essential element related gene masking maintains 'plausibility as personality', which is one of the most important rules in forming the personality and grants the existence meaning to the internal state related genes and the behavior decision related genes.

The internal state related gene masking is achieved by masking a gene value by +1, −1, or 0 so an internal state associated with an external stimulus connected to each gene is appropriately increased, decreased, or not affected. For example, if the user selects 'hitting' as an external stimulus, the 'hostility' attribute is generally manifested rather than the 'intimacy' attribute. In addition, if the user selects 'soothing' as an external stimulus, the 'happiness' attribute is generally manifested rather than the 'sadness' attribute. Likewise, if the user selects 'patting' as an external stimulus, the 'fear' attribute is not manifested. As described above, an internal state related masking process is a process of determining whether an internal state attribute is manifested so an internal state attribute suitable for each external stimulus and a manifested behavior is manifested, and determining whether the internal state attribute is positive or negative, according to customs generally acknowledged by social members. This masking process can be determined by a masking table. For example, an internal state related gene having a masking value of +1 has a positive attribute, an internal state related gene having a masking value of −1 has a negative attribute, and an internal state related gene having a masking value of 0 has no specific attribute. The masking table is illustrated in Table 4.

TABLE 4

|  | Intimacy | Hostility | Hunger | Happiness | Fear |
|---|---|---|---|---|---|
| Feeding | 0 | 0 | −1 | +1 | 0 |
| Patting | +1 | −1 | 0 | +1 | 0 |
| Hitting | −1 | +1 | 0 | 0 | +1 |
| Surprising | 0 | 0 | 0 | 0 | +1 |

Referring to Table 4, in the case of 'feeding', a masking value of 'hunger' is −1, a masking value of 'happiness' is +1, and all other masking values are 0. That is, when the user selects 'feeding' as an external stimulus, the 'hunger' attribute decreases, the 'happiness' attribute increases, and the other internal state attributes, i.e. intimacy, hostility, and fear, have no change. Thus, through this masking process, the robot genome generation system according to the present invention can reflect the facts generally acknowledged by social members in the present era on the sensitivity of a robot. However, by changing a specific masking value of the masking table according to the selection of the user, a specific attribute can be of course manifested differently from the common sense.

Each behavior decision related gene is masked by 1 or 0 so a proper behavior associated with specific internal state and stimulus information is manifested or not. For example, if a stimulus 'hitting' is input and a state of 'intimacy' is the lowest, behaviors, such as 'acting cute with a happy expression', are not manifested. Instead, behaviors, such as 'snarling', are manifested. That is, for the internal state attribute 'intimacy', a masking value of 'acting cute with a happy expression' is 0, and a masking value of 'snarling' is +1.

Thus, through this masking process, the robot genome generation system according to the present invention can reflect the facts generally acknowledged by social members in the present era on the personality of a robot. However, if the user wants to change these masking values, a specific attribute can, of course, be manifested differently from the common sense by changing a specific masking value of a masking table according to the selection of the user. Table 5 illustrates a masking table according to the behavior decision related genes.

TABLE 5

|  | Intimacy | Hostility | Hunger | Happiness | Fear |
|---|---|---|---|---|---|
| Acting cute | +1 | 0 | 0 | 0 | 0 |
| Snarling | 0 | +1 | 0 | 0 | 0 |
| Shivering | 0 | 0 | 0 | 0 | +1 |
| Pretending to hungry | 0 | 0 | +1 | 0 | 0 |

The controller 100 controls the stimulus scenario generator 110 to generate a stimulus scenario for testing whether each of the robot genomes of the current robot genome group in which the initial values are set manifest proper personality according to user preferences. The stimulus scenario generator 110 may include a stimulus scenario setting unit 122 to change the contents of a currently set stimulus scenario or generate a new stimulus scenario according to the settings of the user.

In this case, the user can set types of stimuli contained in a stimulus scenario, a manifestation frequency of each stimulus, and a lasting time of each stimulus. When the user sets or selects a stimulus scenario, a stimulus scenario selection window or a stimulus scenario setting window can be displayed on the display unit of the user preference input unit 104 or output to the robot platform of the user via the output unit 118 used to output the stimulus scenario selection window or the stimulus scenario setting window to the robot platform of the user.

The controller 100 controls the manifestation unit 112 to test each of the robot genomes of the current robot genome group according to the set stimulus scenario and manifest a testing result. That is, if a stimulus scenario is set by the stimulus scenario generator 110, the manifestation unit 112 selects one robot genome from the robot genome group according to the set stimulus scenario and manifests the robot genome in the order of stimuli contained in the set stimulus scenario for the time set in the set stimulus scenario. Iteratively, the manifestation unit 112 manifests all robot genomes included in the current robot genome group according to the set stimulus scenario. If all robot genomes of the current robot genome group are completely manifested by the manifestation unit 112, the controller 100 transmits the manifestation results and the robot genomes to the suitability determiner 114.

The suitability determiner 114 receives a manifestation result of each robot genome and the robot genomes under the control of the controller 100. The manifestation result of each robot genome indicates a trajectory value per sampling time of all internal state attributes during the stimulus scenario, an integral value of the trajectory values, and the number of manifestations of group behaviors per internal state attribute. The suitability determiner 114 calculates a ratio of an integral value of each internal state attribute to a sum of integral values of all internal state attributes during the stimulus scenario for the manifestation result of each robot genome. These ratios are herein called internal state attribute occupancy ratios. That is, an internal state attribute occupancy ratio is a ratio of one of manifestation results of all internal state attributes (e.g., an integral value of internal state values of the internal state attribute 'intimacy' during the stimulus scenario) to a sum of manifestation results of all internal state attributes (e.g., a sum of integral values of internal state values of all internal state attributes 'intimacy', 'hostility', 'curiosity', and so on) for each internal state attribute of an arbitrary genome manifestation result having an arbitrary value per sampling time during the stimulus scenario.

The suitability determiner 114 selects one of the internal state attribute occupancy ratios. The suitability determiner 114 extracts a preference corresponding to the currently selected internal state attribute occupancy ratio from among internal state attribute preferences for each internal state, which are input by the user. The suitability determiner 114 calculates a ratio of the extracted internal state attribute preference to a sum of internal state attribute preferences set by the user. This ratio is called an internal state attribute preference gain. That is, the internal state attribute preference gain means a ratio of an internal state attribute preference value input by the user for a specific internal state attribute to a sum of internal state attribute preference values input by the user.

The suitability determiner 114 calculates an absolute value of a difference between an internal state attribute preference gain and a corresponding internal state attribute occupancy ratio, for each internal state attribute. The suitability determiner 114 adds the calculated absolute values. The addition result is called internal state related suitability.

The suitability determiner 114 may calculate each internal state attribute occupancy ratio and an occupancy ratio of the number of behavior manifestations classified for each internal state attribute. In this case, the suitability determiner 114 calculates a ratio of the number of behavior manifestations classified for each internal state attribute to a sum of numbers of behavior manifestations classified for all internal state attributes of a robot genome (or the number of entire behavior manifestations), for each behavior manifested by a result of the stimulus scenario from a manifestation result of the robot genome according to the result of the stimulus scenario. This ratio is herein called 'internal state attribute-based behavior manifestation count occupancy ratio'.

In this case, the suitability determiner 114 calculates an internal state attribute-based behavior manifestation count occupancy ratio based on a behavior preference classified for each internal state attribute. The suitability determiner 114 calculates an absolute value of a difference between a behavior preference gain classified for each internal state attribute and a corresponding internal state attribute-based behavior manifestation count occupancy ratio, for each internal state attribute in a similar method to that in the internal state related suitability, and calculates a sum of calculated absolute values. This sum is called behavior decision related suitability. The behavior preference gain classified for each internal state attribute means a ratio of a currently selected behavior preference to a sum of behavior preferences input for each internal state attribute by the user. The suitability determiner 114 calculates a reliability value by adding the internal state related suitability and the behavior decision related suitability, scaling the addition result using a scaling value, and subtracting the scaling result from a suitability constant. A function used to calculate a reliability value of each robot genome using a manifestation result of each of the robot genomes included in the robot genome group in the present invention is called a suitability function. The suitability determiner 114 determines, based on a reliability value according to a calculation result of the suitability function, how much a currently selected robot genome reflects preference values set by the user.

Equation (3) is used to calculate a reliability value. In Equation (3), it is assumed that when the internal state related suitability is calculated, all internal state attributes are classified into 3 types, i.e. internal states belonging to 'motivation', 'homeostasis', and 'emotion', an internal state related suitability value of each internal state is calculated, and all the calculated internal state related suitability values are added.

$$\Phi(j\Delta T, g) = C - \rho \begin{bmatrix} \sum_{k=1}^{6} (1/\varphi_k^I)|\varphi_k^I - \Phi_{pk}^M(j\Delta T, g)| + \\ \sum_{k=7}^{9} (1/\varphi_k^I)|\varphi_k^I - \Phi_{pk}^H(j\Delta T, g)| + \\ \sum_{k=10}^{14} (1/\varphi_k^I)|\varphi_k^I - \Phi_{pk}^E(j\Delta T, g)| + \\ \sum_{k=1}^{14} (1/\varphi_k^B)|\varphi_k^B - \Phi_{jk}^{BG}(j\Delta T, g)| \end{bmatrix} \quad 3$$

$1/\phi_k^I$ denotes a weight of a $k^{th}$ internal state and a value to expedite the convergence of an occupancy ratio of a $k^{th}$ internal state integral value. In addition, C denotes the suitability constant, and ρ denotes a scaling factor for a percentage calculation, i.e., a reference value.

In addition, $$\sum_{k=1}^{6} (1/\varphi_k^I)|\varphi_k^I - \Phi_{pk}^M(j\Delta T, g)|$$

is used to obtain a sum of absolute values of a difference between an internal state attribute preference gain and an internal state attribute occupancy ratio of each of internal states corresponding to 'motivation' among all internal state attributes. That is, $\phi_k^I$ denotes an internal state attribute preference gain of a $k^{th}$ internal state attribute among the internal state attributes belonging to 'motivation', and $\Phi_{pk}^M(j\Delta T,g)$ denotes an internal state attribute occupancy ratio of a $k^{th}$ internal state among the internal state attributes belonging to 'motivation'. Thus, a calculation result of $$\sum_{k=1}^{6} (1/\varphi_k^I)|\varphi_k^I - \Phi_{pk}^M(j\Delta T, g)|$$

is internal state related suitability of internal state related genes corresponding to 'motivation'.

In addition, $$\sum_{k=7}^{9} (1/\varphi_k^I)|\varphi_k^I - \Phi_{pk}^H(j\Delta T, g)|$$

is used to obtain a sum of absolute values of a difference between an internal state attribute preference gain and an internal state attribute occupancy ratio of each of internal states corresponding to 'homeostasis' among all internal state attributes. That is, $\phi_k^I$ denotes an internal state attribute preference gain of a $k^{th}$ internal state attribute among the internal state attributes belonging to 'homeostasis', and $\Phi_{pk}^H(j\Delta T,g)$ denotes an internal state attribute occupancy ratio of the $k^{th}$ internal state among the internal state attributes belonging to 'homeostasis'. Thus, a calculation result of $$\sum_{k=7}^{9} (1/\varphi_k^I)|\varphi_k^I - \Phi_{pk}^H(j\Delta T, g)|$$

is internal state related suitability of internal state related genes corresponding to 'homeostasis'.

In addition, $$\sum_{k=10}^{14}(1/\varphi_k^I)|\varphi_k^I-\Phi_{pk}^E(j\Delta T,g)|$$

is used to obtain a sum of absolute values of a difference between an internal state attribute preference gain and an internal state attribute occupancy ratio of each of internal states corresponding to 'emotion' among all internal state attributes. That is, $\phi_k^I$ denotes an internal state attribute preference gain of a $k^{th}$ internal state attribute among the internal state attributes belonging to 'emotion', and $\Phi_{pk}^E(j\Delta T,g)$ denotes an internal state attribute occupancy ratio of the $k^{th}$ internal state among the internal state attributes belonging to 'emotion'. Thus, a calculation result of $$\sum_{k=10}^{14}(1/\varphi_k^I)|\varphi_k^I-\Phi_{pk}^E(j\Delta T,g)|$$

is internal state related suitability of internal state related genes corresponding to 'emotion'.

In addition, $$\sum_{k=1}^{14}(1/\varphi_k^B)|\varphi_k^B-\Phi_{fk}^{BG}(j\Delta T,g)|$$

is used to obtain a sum of absolute values of a difference between a behavior preference gain and an internal state attribute-based behavior manifestation count occupancy ratio, for each internal state attribute. That is, $\phi_k^B$ denotes a behavior preference gain classified for a $k^{th}$ internal state attribute among the internal state attributes, and $\Phi_{fk}^{BG}(j\Delta T,g)$ denotes an internal state attribute-based behavior manifestation count occupancy ratio of the $k^{th}$ internal state among the internal state attributes. Thus, a calculation result of $$\sum_{k=1}^{14}(1/\varphi_k^B)|\varphi_k^B-\Phi_{fk}^{BG}(j\Delta T,g)|$$

is behavior related suitability.

The internal state attribute preference gain and the behavior preference gain in Equation (3) can be obtained as in Equation (4).

$$\varphi_k^I=\psi_k^I\bigg/\sum_{l=1}^{14}\psi_l^I$$

$$\varphi_k^B=\psi_k^B\bigg/\sum_{l=1}^{14}\psi_l^B \qquad 4$$

As described above, $\phi_k^I$ denotes the $k^{th}$ internal state attribute preference gain, and $\phi_k^B$ denotes the behavior preference gain classified for the $k^{th}$ internal state attribute. In addition, $\psi_k^I$ denotes an internal state attribute preference of a $k^{th}$ internal state, which is input by the user using the GUI, and $\psi_k^B$ denotes a behavior preference classified for each internal state attribute with respect to the $k^{th}$ internal state, which is input by the user using the GUI. In addition, $$\sum_{l=1}^{14}\psi_l^I$$

denotes a sum of internal state attribute preferences, and $$\sum_{l=1}^{14}\psi_l^B$$

denotes a sum of behavior preferences classified for the internal state attributes. Thus, each internal state attribute preference gain can be obtained by dividing each internal state attribute preference value by a sum of all the internal state attribute preference values, and a behavior preference gain classified for each internal state attribute can be obtained by dividing a behavior preference classified for each internal state attribute by a sum of behavior preferences classified for all the internal state attributes. Thus, In Equation (3), the entire internal state related suitability of the currently selected robot genome is obtained by adding the calculation result of $$\sum_{k=1}^{6}(1/\varphi_k^I)|\varphi_k^I-\Phi_{pk}^M(j\Delta T,g)|,$$

the calculation result of $$\sum_{k=7}^{9}(1/\varphi_k^I)|\varphi_k^I-\Phi_{pk}^H(j\Delta T,g)|,$$

and the calculation result of $$\sum_{k=10}^{14}(1/\varphi_k^I)|\varphi_k^I-\Phi_{pk}^E(j\Delta T,g)|.$$

Since the behavior related suitability is $$\sum_{k=1}^{14}(1/\varphi_k^B)|\varphi_k^B-\Phi_{pk}^{BG}(j\Delta T,g)|,$$

the reliability value $\Phi(j\Delta T,g)$ of the currently selected robot genome can be obtained by subtracting a sum of the calculation results from the suitability constant C. The suitability determiner 114 calculates reliability values of all robot genomes of the current robot genome group and extracts a number of robot genomes in the order from high to low reliability values extracted from the robot genomes, using an extractor 124. The suitability determiner 114 determines whether the extracted robot genomes are reliable by checking whether reliability values of the extracted robot genomes are within a user reliable range.

Whether the extracted robot genomes are reliable means whether the robot genomes extracted according to the currently calculated reliability values are suitable for the preferences input by the user. That is, Equation (3) is to obtain a sum of differences between each internal state attribute preference value input by the user and each internal state attribute occupancy ratio manifested according to the stimulus scenario. Thus, as a sum of differences is smaller, i.e., as a reliability value is larger, it indicates that the robot genome well reflects the preferences input by the user. Thus, the suitability determiner 114 extracts the number of robot genomes in the order from high to low reliability values from among the robot genomes of the robot genome group, and when reliability values of the extracted robot genomes are within the reliable range, the suitability determiner 114 can determine that the extracted robot genomes are suitable for the preferences input by the user. This can be to determine whether the extracted robot genomes are reliable.

The controller 100 determines whether one of the currently extracted robot genomes is output as a robot genome suitable for the user preferences, according to the reliability determination result of the suitability determiner 114. If the suitability determiner 114 determines that the extracted robot genomes are suitable for the user preferences, the controller 100 outputs one of the extracted robot genomes via the output unit 118. The output unit 118 is to output one of the extracted robot genomes to the robot platform of the user.

If the suitability determiner 114 determines that the extracted robot genomes are not suitable for the user preferences, the controller 100 transmits the extracted robot genomes to the modification unit 116 and generates robot genomes again, which reflect the internal state attribute preferences and the behavior preferences input by the user.

The modification unit 116 modifies the received robot genomes using various methods. For these modification methods, a learning process, such as evolution calculation or neural network calculation, can be used. The evolution calculation is to modify robot genomes in order to find out a robot genome optimal to the user preferences by maximizing a reliability value according to the suitability function while modifying and updating the robot genomes over several generations based on the theory of evolution, such as crossover, mutation, and so on.

While conventional evolution calculations usually deal with genomes composed of only homogeneous genes to a genome having one-dimensional structure, the present invention uses a crossover method suitable for genomes composed of heterogeneous genes of a two-dimensional structure. Examples of an evolution calculation method according to the present invention are a general crossover calculation for performing modification by exchanging essential element related genes, internal state related genes, and behavior decision related genes according to a specific internal state with another robot genome, independent crossover calculation for performing modification by independently exchanging essential element related genes, internal state related genes, and behavior decision related genes according to a specific internal state with another robot genome, uniform crossover calculation for performing modification by exchanging specific essential element related genes, specific internal state related genes, and specific behavior decision related genes with another robot genome regardless of an internal state, building crossover calculation for performing modification by exchanging specific essential element related genes, specific internal state related genes, and specific behavior decision related genes with another robot genome in an aggregate manner according to a plurality of internal states, and mutation calculation for randomly selecting at least one of specific essential element related genes, specific internal state related genes, and specific behavior decision related genes and modifying their values. For the neural network calculation, an arbitrary neural network learning calculation method, such as a delta rule, can be used.

The modification unit 116 may perform the modification of robot genomes using the crossover calculation method, such as the general crossover calculation, the independent crossover calculation, the uniform crossover calculation, or the building crossover calculation, and modify the once modified robot genomes using the mutation calculation or the neural network calculation. The modification order can be changed. That is, the modification unit 116 can iteratively modify robot genomes using a randomly selected modification method a number of times.

After the modification of the extracted robot genomes is completed, the modification unit 116 transmits the modified robot genomes to the controller 100. The controller 100 generates a new robot genome group by adding the newly generated robot genomes and the robot genomes received from the modification unit 116 according to a reliability determination result of the suitability determiner 114. The controller 100 transmits the new robot genome group to the manifestation unit 112 to manifest robot genomes of the new robot genome group according to the currently set stimulus scenario. The controller 100 transmits the manifestation results of the robot genomes to the suitability determiner 114 to calculate internal state related suitability and behavior decision related suitability and calculates a reliability value of each manifested robot genome using a sum of the internal state related suitability and the behavior decision related suitability. A number of robot genomes are extracted in the order from high to low reliability values from among the robot genomes of the new robot genome group, and whether the extracted robot genomes are reliable is determined by checking whether reliability values of the extracted robot genomes are within the user reliable range. According to whether the extracted robot genomes are reliable, one of the extracted robot genomes is extracted, or the above-described procedures are repeated until reliability values of the extracted robot genomes are within the user reliable range.

Accordingly, in the robot genome generation system according to the present invention, even if the user did not input all of thousands parameters for a robot genome, a robot genome reflecting preferences input by the user can be generated, and it is reliable that the generated robot genome reflects the preferences input by the user. A robot genome output through the above-described process has a tendency similar to internal state attribute preferences and internal state attribute-based behavior preferences, and when the robot genome is compared to a robot genome generated using the conventional simple initialization, the robot genome has the performance closer to preference values input by the user and more robust to various stimuli.

Figure 2:
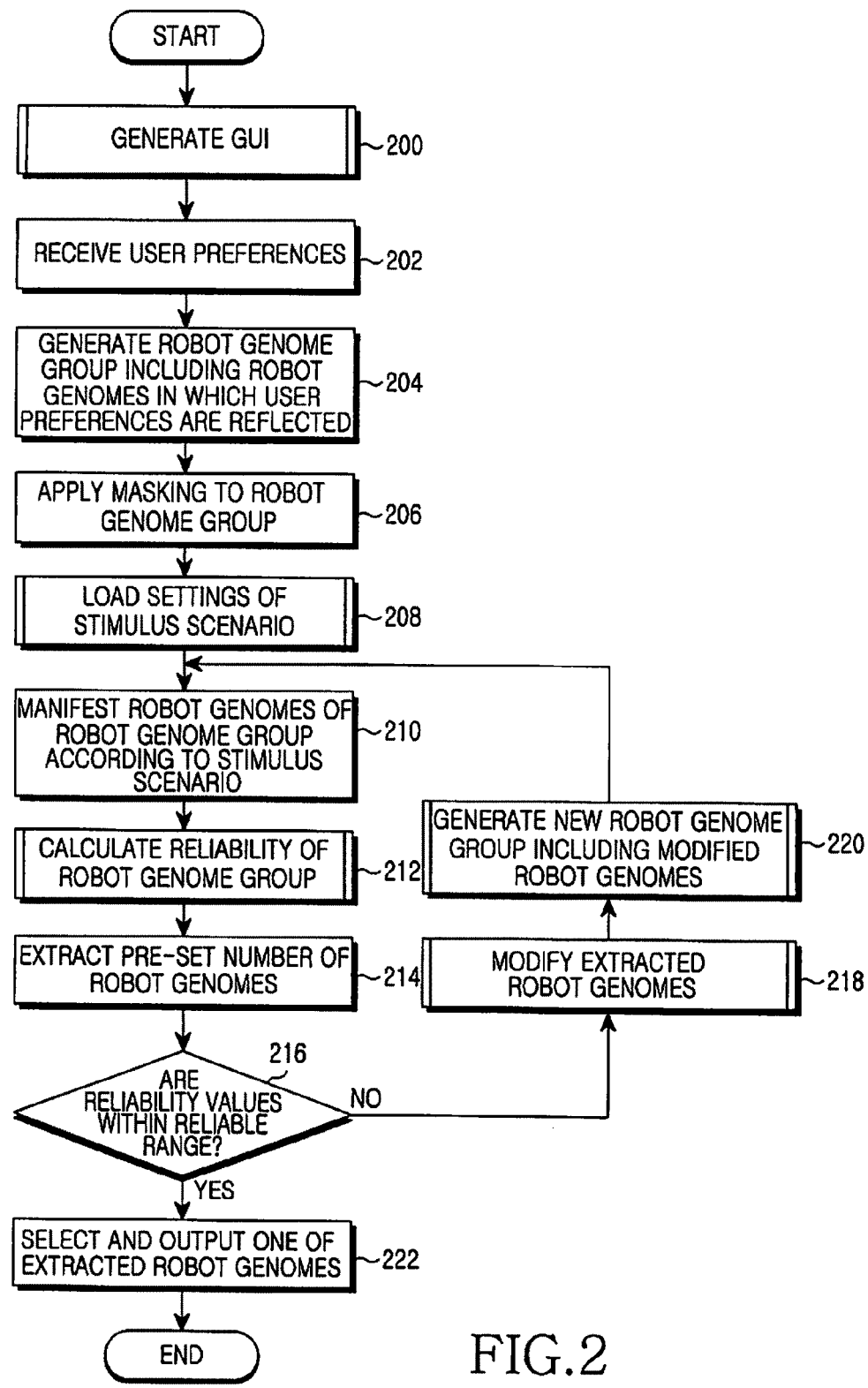
FIG. 2 is a flowchart of a process of generating a robot genome according to user input preference values in a robot genome generation system according to the present invention.

FIG. 2 shows a process of generating a robot genome according to user input preference values in a robot genome generation system according to the present invention. The controller 100 of the robot genome generation system according to the present invention controls the user preference input unit 104 to generate a GUI in step 200. The GUI includes an input menu for receiving internal state attribute preferences and behavior preferences. The process of generating a GUI including an input menu for receiving internal state attribute preferences and behavior preferences will be described later with reference to FIG. 3, which illustrates the process of generating a GUI, and FIG. 4, which illustrates a GUI screen.

When the GUI is generated, the controller 100 receives internal state attribute preferences and behavior preferences using the GUI in step 202. The controller 100 calculates initial values of internal state related genes according to the received internal state attribute preferences and calculates initial values of behavior decision related genes according to the received behavior preferences in step 204. The initial values of the internal state related genes and the initial values of the behavior decision related genes can be calculated using Equations (1) and (2). In addition, the controller 100 generates a robot genome including the calculated internal state related genes, the calculated behavior decision related genes, and pre-set or randomly generated essential element related genes. The controller 100 generates a robot genome group by repeating the robot genome generation process a number of times.

The controller 100 performs a masking process of the robot genomes of the currently generated robot genome group in step 206. As described above, the masking process determines internal state attributes manifested due to a specific stimulus and a specific behavior by multiplying a currently set robot genome by values of the masking table, and determines whether the internal state attributes manifested due to the specific stimulus and the specific behavior are positive or negative.

The masking of the initial values of the internal state related genes is performed after the initial values of the internal state related genes are set, however, the initial values of the behavior decision related genes may be generated after the masking of the behavior decision related genes is performed. That is, the internal state related genes can have positive or negative attributes according to user preferences, however, since the behavior decision related genes are used to determine whether to be manifested as described above, the masking of the behavior decision related genes does not have to be performed after the initial values of the behavior decision related genes are generated. That is, an amount of computation can be reduced by performing the masking of the behavior decision related genes and calculating initial value for only behavior decision related genes determined to be manifested.

Figure 5:
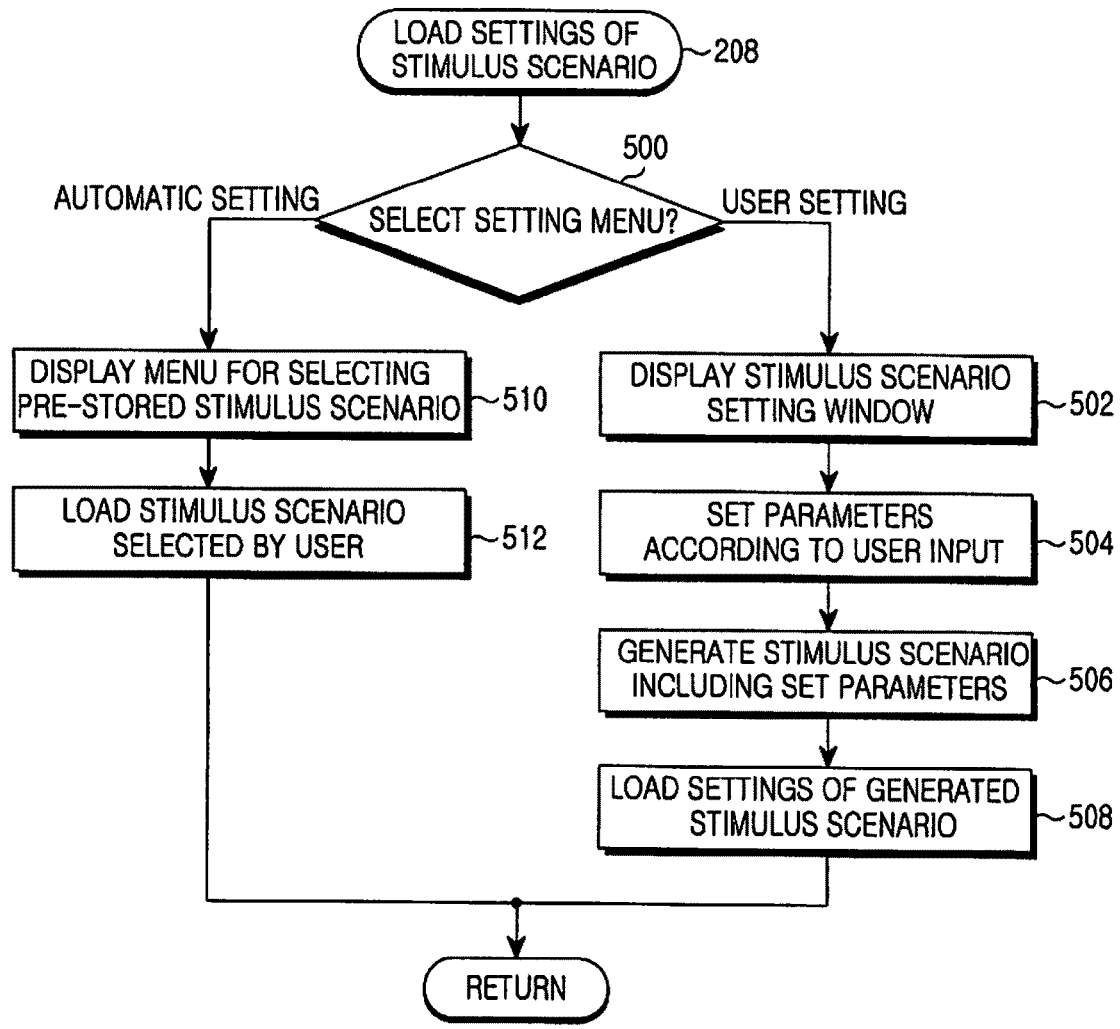
FIG. 5 is a flowchart of a process of setting a stimulus scenario for checking whether an initialized robot genome is manifested in a robot genome generation system according to the present invention.
Figure 6:
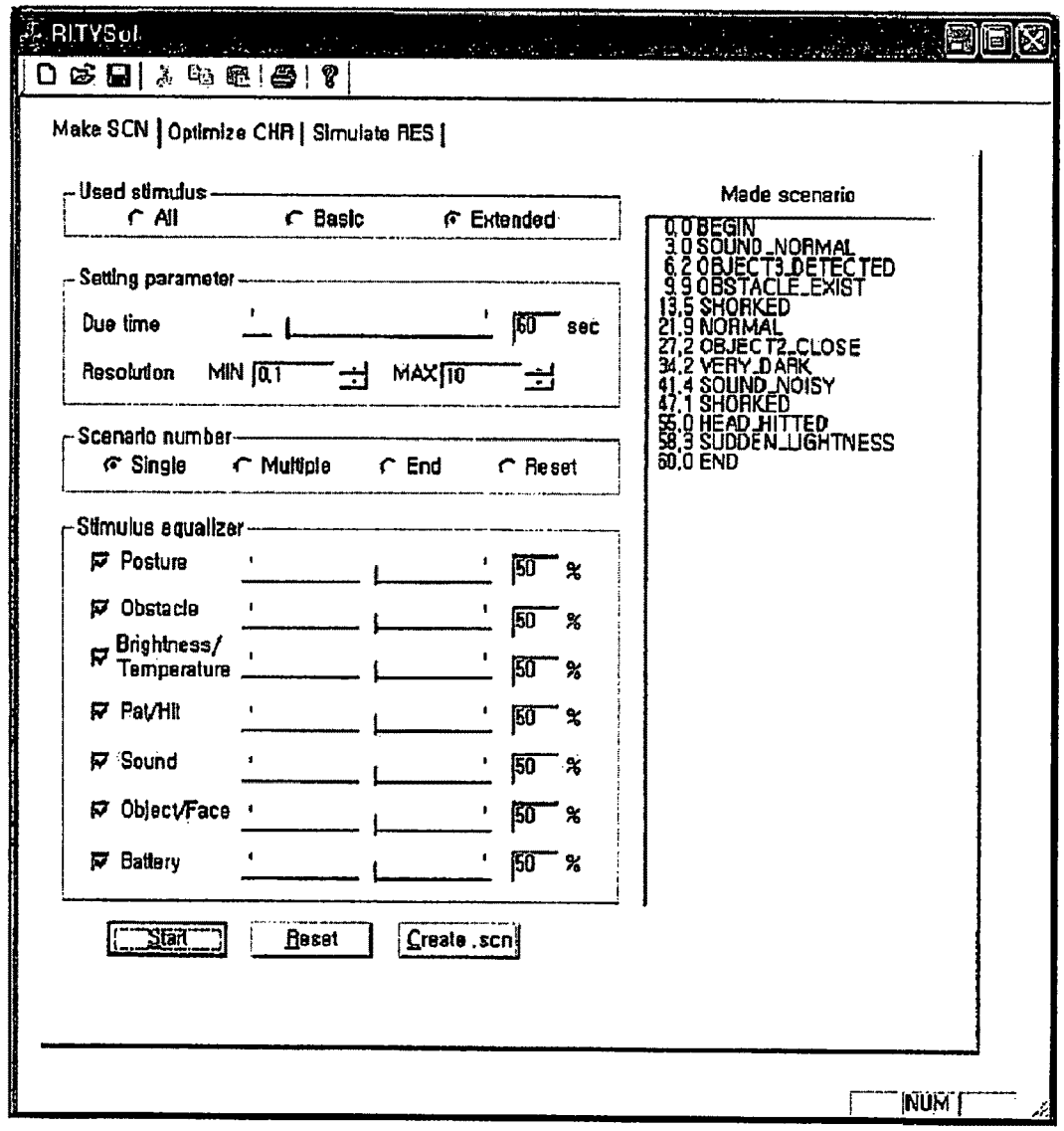
FIG. 6 illustrates a stimulus scenario setting window when a user sets a stimulus scenario in a robot genome generation system according to the present invention.

The controller 100 loads a currently set stimulus scenario in step 208. Stimuli reflects a concept including not only simple external stimuli but also perception in a point of view of a robot for a specific behavior. That is, the stimuli include simple external stimuli, such as 'surprising', 'patting', and 'hitting', specifically manifested behaviors, such as 'rolling', looking around', and 'searching', and stimuli causing these specifically manifested behaviors. In step 208, the user can select pre-stored stimulus scenarios or can directly generate a stimulus scenario. When the user directly generates a stimulus scenario, the user determines types of stimuli to be contained in the stimulus scenario, a manifestation frequency of each of the stimuli, time for applying each of the stimuli, and so on. If the user selects or generates a stimulus scenario, the controller 100 loads settings of the generated or selected stimulus scenario. FIG. 5 shows a process of generating a stimulus scenario according to the selection of the user when the user directly generates the stimulus scenario, and FIG. 6 illustrates a screen for generating the stimulus scenario. The process used by the user to generate a stimulus scenario will be described later with reference to FIGS. 5 and 6.

The controller 100 manifests each of the robot genomes included in the robot genome group according to the set stimulus scenario using the manifestation unit 112 in step 210. When the manifestation of all the robot genomes is completed, the controller 100 transmits manifestation results of the robot genomes manifested according to the stimulus scenario, and the robot genomes to the suitability determiner 114 in step 212. In addition, the controller 100 controls the suitability determiner 114 to calculate internal state related suitability and behavior decision related suitability of each robot genome and calculate a reliability value of each robot genome using a sum of the internal state related suitability value and the behavior decision related suitability value of each robot genome. When all reliability values of the robot genomes included in the robot genome group are calculated, the controller 100 controls the suitability determiner 114 to extract a number of robot genomes in the order from high to low reliability values in step 214.

The controller 100 determines in step 216 whether reliability values of the extracted robot genomes are within a reliable range. The determination of whether the reliability values of the extracted robot genomes are within the reliable range can be variously set according to the selection of the user or another condition. That is, the extracted robot genomes may be determined to be suitable for the user preferences when all the reliability values of the extracted robot genomes are within the reliable range, or when a representative value of the reliability values of the extracted robot genomes (e.g., mean, median, maximum, or minimum of the reliability values) is within the reliable range.

If it is determined in step 216 that the extracted robot genomes are suitable for the user preferences, the controller 100 selects and outputs one of the extracted robot genomes in step 222. In this selection, the controller 100 can select one of the extracted robot genomes randomly or a robot genome having the highest reliability value, according to the selection of the user or another condition.

If it is determined in step 216 that the extracted robot genomes are not suitable for the user preferences, the controller 100 transmits the extracted robot genomes to the modification unit 116 to variously modify them in step 218.

Figure 8:
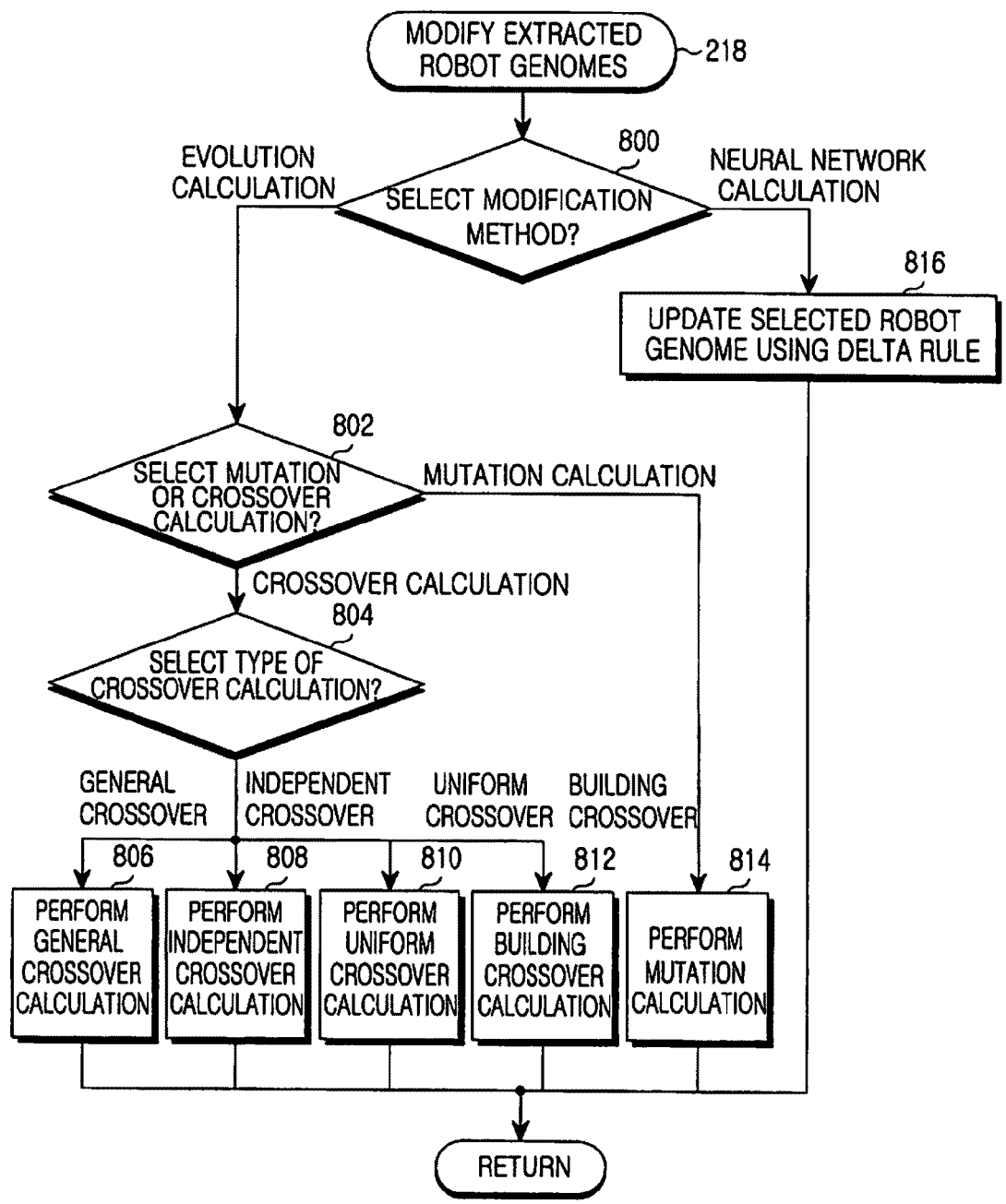
FIG. 8 is a flowchart of a process of modifying currently extracted robot genomes in a robot genome generation system according to the present invention.

The modification unit 116 modifies essential element related genes, internal state related genes, and behavior decision related genes of the received robot genomes in various methods by using a general crossover calculation, independent crossover calculation, uniform crossover calculation, building crossover calculation, and/or mutation calculation process when evolution calculation is used, or using a various updating process of a neural network, such as a delta rule, a gradient descent, etc., when a neural network calculation is used. FIG. 8 shows a process of modifying robot genomes, and FIGS. 9 to 12 respectively illustrate a general crossover calculation, an independent crossover calculation, a uniform crossover calculation, and a building crossover calculation among evolution calculations. A process of modifying robot genomes will be described later with reference to FIGS. 8 to 12.

If the modification of the received robot genomes is completed, the controller 100 generates the number of new robot genome group including the modified robot genomes in step 220. The other robot genomes excluding the modified robot genomes have initial values generated by reflecting the user preferences and are masked by the masking unit 108.

If the new robot genome group including a plurality of robot genomes in which the modified robot genomes are included is generated, the controller 100 manifests each of the robot genomes included in the new robot genome group according to the set stimulus scenario again in step 210. The controller 100 calculates a reliability value of each of the robot genomes in step 212, extracts a portion of the robot genomes in step 214, and determines in step 216 whether reliability values of the extracted robot genomes satisfy user suitability. According to a result of the determination, the controller 100 iteratively performs steps 210 through to 216 or outputs one robot genome suitable for the user preferences in step 222. Thus, according to the present invention, the user can generate a robot genome in which the user preferences are reflected, and the output robot genome is reliably suitable for the user preferences input by the user.

Figure 3:
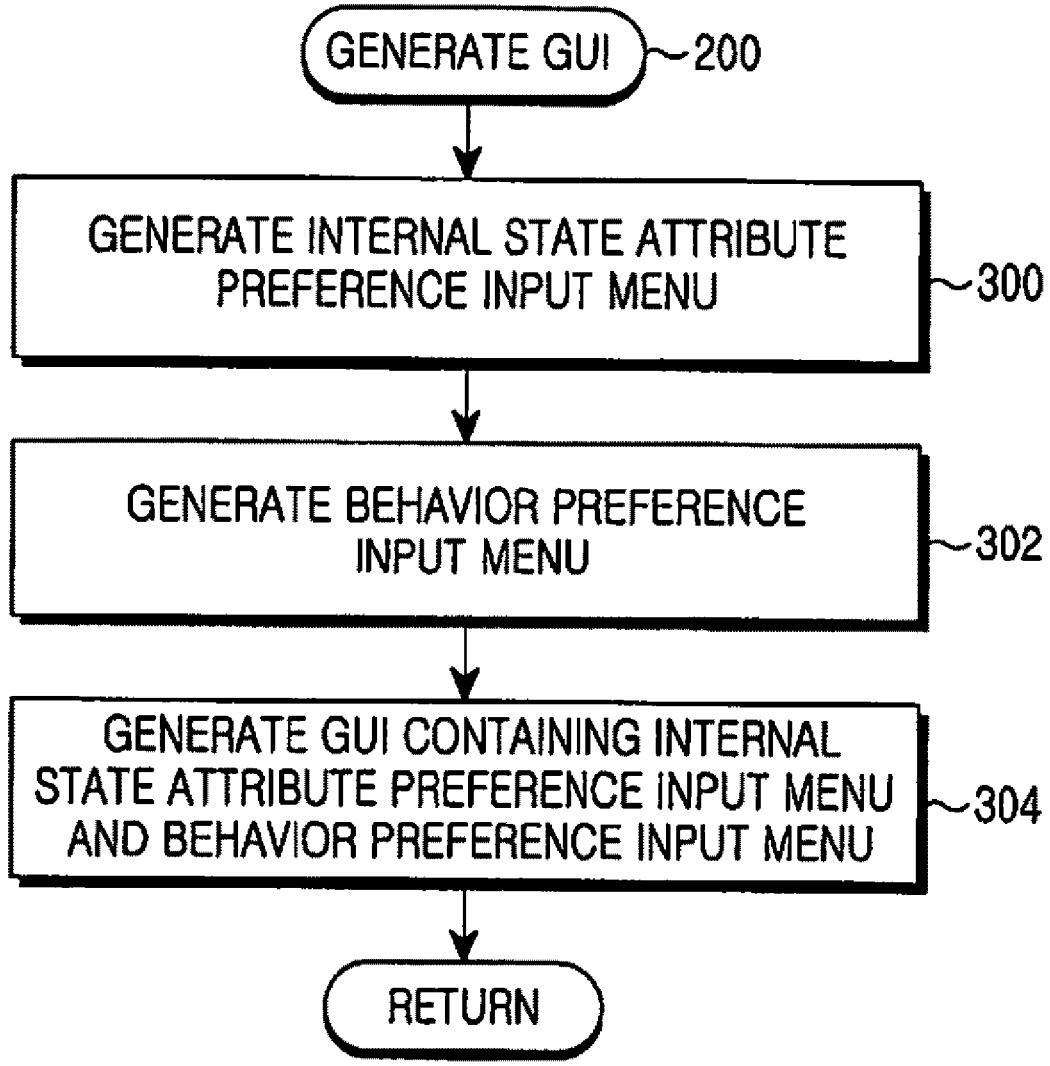
FIG. 3 is a flowchart of a process of generating a Graphic User Interface (GUI) screen for receiving preferences of internal state attributes from a user in a robot genome generation system according to the present invention.

FIG. 3 shows a process of generating a GUI screen for receiving preferences of internal state attributes from a user in a robot genome generation system according to the present invention. When the user selects to begin generation of a robot genome, the controller 100 of the robot genome generation system according to the present invention generates an internal state attribute preference input menu, which is an input menu allowing the user to set internal state attribute preferences of internal state attributes, in step 300. The controller 100 generates a behavior preference input menu, which is an input menu allowing the user to set behavior preferences of the internal state attributes, in step 302. The controller 100 generates a GUI containing the internal state attribute preference input menu and the behavior preference input menu in step 304.

Figure 4:
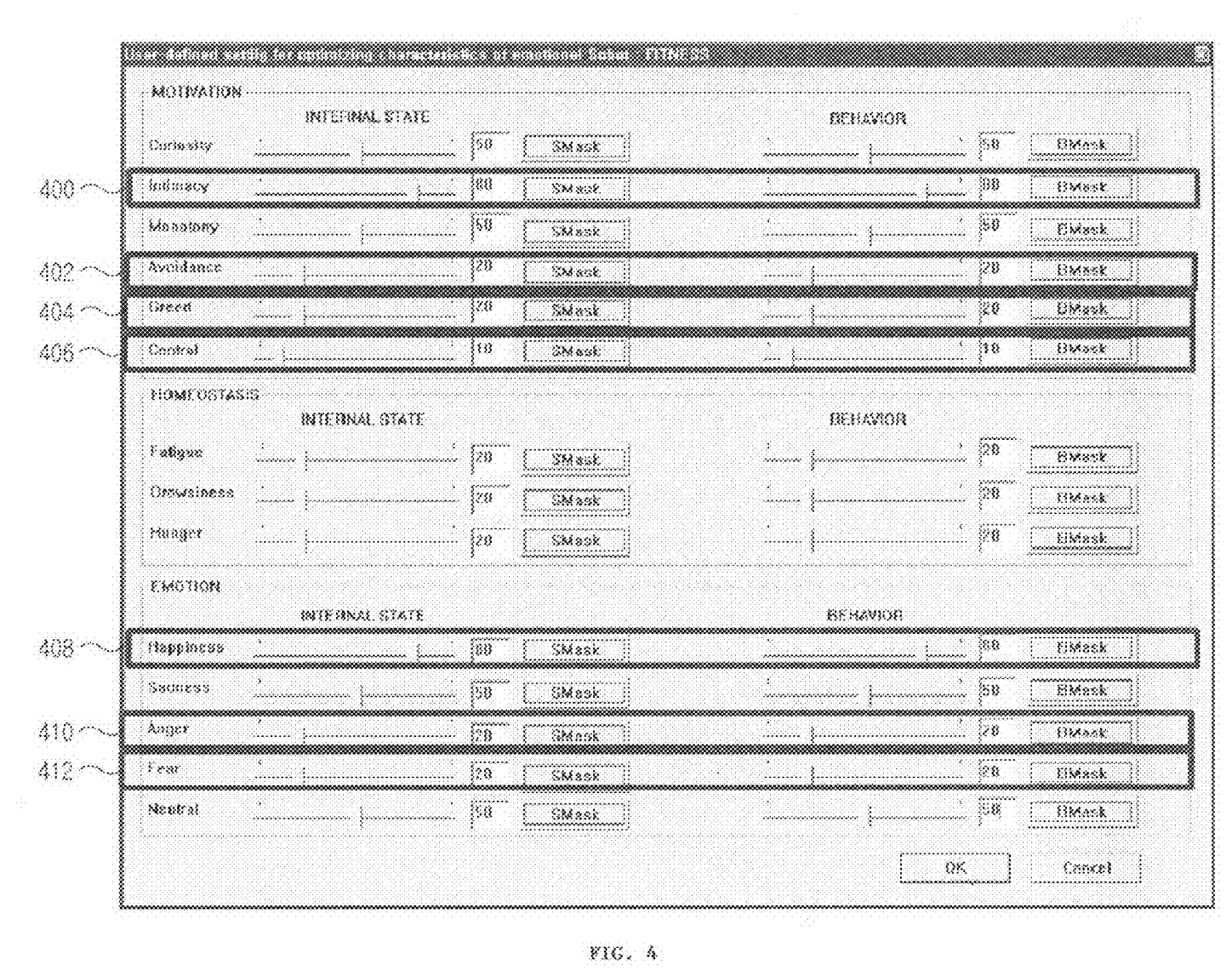

FIG. 4 shows a GUI screen through which a user can input a preference value of each gene in a robot genome generation system according to the present invention. The GUI screen according to the present invention contains the internal state attribute preference input menu and the behavior preference input menu for each internal state attribute as described in steps 300 and 302 of FIG. 3. That is, in this example, it is assumed that the number of parameters input by the user is minimized by inputting only preference of each internal state attribute. Thus, in this case, when the number of internal states, i.e. the number of internal state attributes, is 14, the user inputs only 14 internal state attribute preference values and 14 behavior preference values of the internal state attributes, i.e. a total of 28 preference values.

In response, the controller 100 receives the preferences input by the user in step 202 of FIG. 2. FIG. 4 shows a case where the user has input preferences of specific internal state attributes. The user has increased 'intimacy' 400 and decreased 'avoidance' 402, 'greed' 404, and 'control' 406 among the internal state attributes corresponding to 'motivation' and has increased 'happiness' 408 and decreased 'anger' 410 and 'fear' 412 among the internal state attributes corresponding to 'emotion'. That is, in FIG. 4 the user has set user preferences to result in being friendly to the user, less fear and greed, being straightforward, being optimistic, and a corresponding behavior.

If the user inputs the preferences shown in FIG. 4, the controller 100 calculates initial values of internal state related genes and calculates initial values of behavior decision related genes using the input preferences in step 204 of FIG. 2. In FIG. 4, when 'intimacy' 400 is increased by the user, an internal state related gene having a masking value of 'intimacy' 400 greater than 0 has a high probability of having a value greater than an initial value of the masking value, and an internal state related gene having a masking value of 'intimacy' 400 less than 0 has a high probability of having a value less than an initial value of the masking value. On the other hand, when 'greed' 404 is decreased by the user, an internal state related gene having a masking value of 'greed' 404 greater than 0 has a high probability of having a value less than an initial value of the masking value, and an internal state related gene having a masking value of 'greed' 404 less than 0 has a high probability of having a value greater than an initial value of the masking value.

These are determined by whether each current preference value set by the user is greater or less than the control constant $\lambda_{c1}^{I}$ or $\lambda_{c2}^{I}$ for an external stimulus corresponding to its internal state related gene. That is, referring to Equation (1), if a masking value is equal to or greater than 0, an input user preference is divided by the control constant $\lambda_{c1}^{I}$ (numerator: user preference, denominator: control constant), and if a masking value is less than 0, the control constant $\lambda_{c2}^{I}$ is divided by an input user preference (numerator: control constant, denominator: user preference). Thus, if a user preference is less than the control constant $\lambda_{c1}^{I}$, even if a masking value is equal to or greater than 0, the user preference, which is a numerator, is less than the control constant $\lambda_{c1}^{I}$, which is a denominator, and thus a probability of setting an initial value of a corresponding internal state related gene as a smaller value is higher.

The controller 100 generates a robot genome including internal state related genes, behavior decision related genes, and essential element related genes and generates a robot genome group including a number of robot genomes, in which user preferences are reflected, by iteratively performing this robot genome generation process.

If the masking process in step 206 of FIG. 2 is completed, the controller 100 loads a currently set stimulus scenario in step 208 of FIG. 2. As described above, in step 208, the user can select one of pre-stored stimulus scenarios, directly generate a stimulus scenario, or modify a pre-stored stimulus scenario. FIG. 5 shows a process of setting a stimulus scenario for checking whether an initialized robot genome is manifested, in step 208 of FIG. 2.

In FIG. 5, the controller 100 of the robot genome generation system according to the present invention determines in step 500 whether the user has selected an automatic setting menu for selecting pre-stored stimulus scenarios or a user setting menu for generating a new stimulus scenario.

The controller 100 displays a stimulus scenario selection menu containing currently pre-stored stimulus scenarios in step 510 when step 500 determines that the user has selected the automatic setting menu. The pre-stored stimulus scenarios include stimulus scenarios stored from when the robot genome generation system was available on the market and stimulus scenarios generated and stored by the user. The controller 100 loads one of the pre-stored stimulus scenarios according to the selection of the user in step 512. The controller 100 manifests each of robot genomes included in a currently generated robot genome group according to the currently set stimulus scenario in step 210 of FIG. 2.

The controller 100 displays a stimulus scenario setting window is step 502 to modify stimulus scenario parameters when step 500 determines that the user has selected the user setting menu. FIG. 6 shows a stimulus scenario setting window for setting a stimulus scenario when the user sets the stimulus scenario in step 502 of FIG. 5.

In FIG. 6, the stimulus scenario setting window contains a menu for setting a due time of the stimulus scenario as shown in a "Due time" menu of a "Setting parameter" menu, a menu for setting a stimulus information interval as shown in a "Resolution" menu, and a menu for setting an occurrence probability of each stimulus group as shown in a "Stimulus equalizer" menu.

Referring back to FIG. 5, the controller 100 sets parameters of a stimulus scenario according to the user's input in step 504. The controller 100 generates a stimulus scenario containing the set parameters in step 506. For example, if the user sets the due time of the stimulus scenario to 60 seconds as shown in the "Due time" menu of FIG. 6, the stimulus information interval to minimum 0.1 second and maximum 10 seconds as shown in the "Resolution" menu, and the occurrence probability of each stimulus group to 50% as shown in the "Stimulus equalizer" menu in step 504, the controller 100 generates a stimulus scenario in step 506, in which its due time is 1 minute, each stimulus information interval is between minimum 0.1 second and maximum 10 seconds, and the occurrence probability of each stimulus group is 50%. The controller 100 loads settings of the generated stimulus scenario in step 508 to manifest robot genomes of the current robot genome group according to the generated stimulus scenario. In step 502, the stimulus scenario setting window for generating a new stimulus scenario or settings of a stimulus scenario may be displayed.

Figure 7:
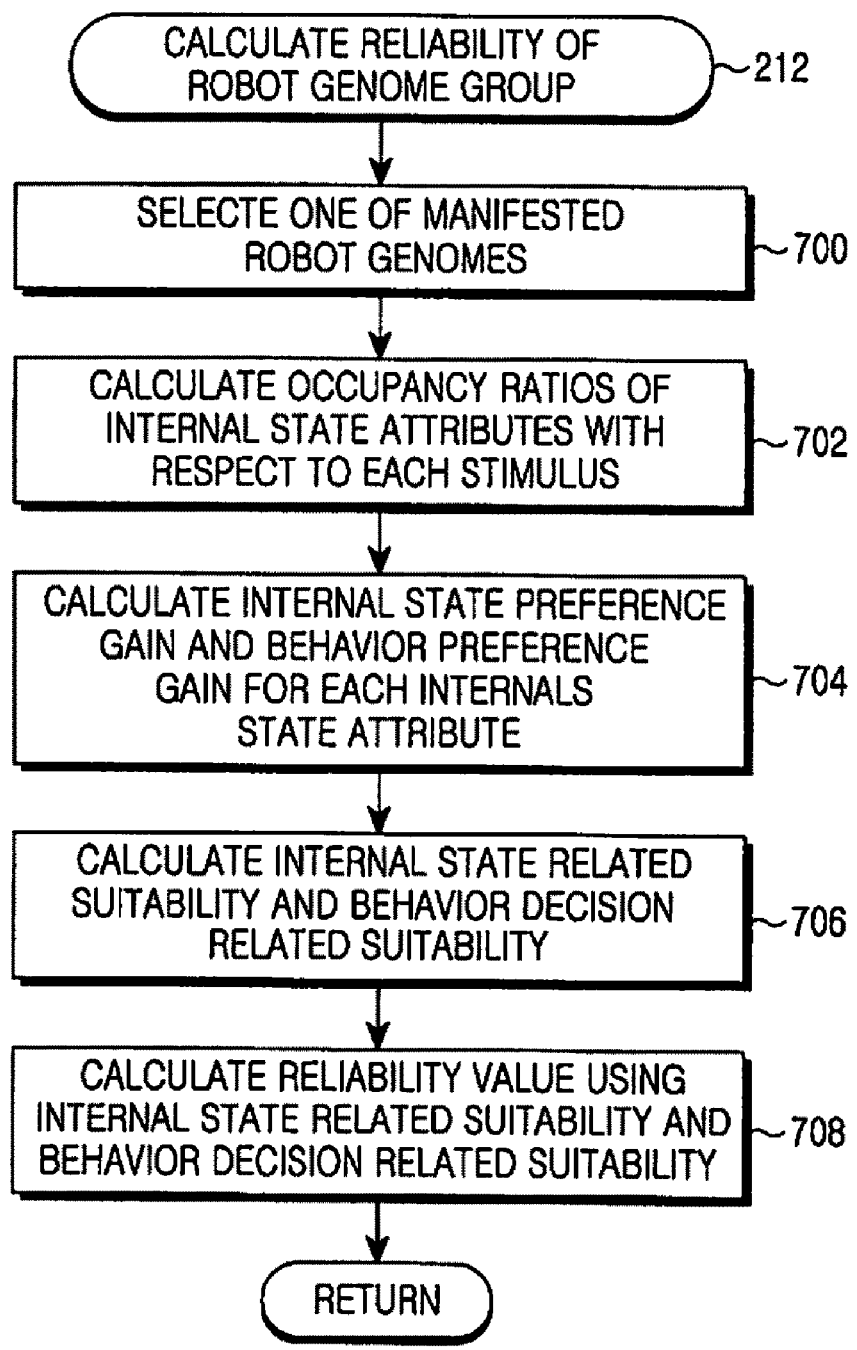
FIG. 7 is a flowchart of a process of calculating a reliability value for determining whether a robot genome manifested according to a currently set stimulus scenario satisfies user preferences input by a user in a robot genome generation system according to the present invention.

FIG. 7 shows a process of calculating a reliability value for determining whether a robot genome manifested according to a currently set stimulus scenario satisfies user preferences input by a user in a robot genome generation system according to the present invention. The determination of suitability is accomplished through the process described in the suitability determiner 114. That is, when a plurality of robot genomes are manifested according to the currently set stimulus scenario, the controller 100 selects one of the manifested robot genomes in step 700. The controller 100 calculates occupancy ratios of internal state attributes with respect to each stimulus in step 702. The controller 100 calculates a preference gain for each internal state attribute in step 704. The preference gain can be calculated as an internal state attribute preference gain and a behavior preference gain as shown in Equation (4).

The controller 100 calculates an absolute value of a difference between an internal state attribute preference gain and a corresponding internal state attribute occupancy ratio, for each internal state related gene in step 706. The controller 100 calculates internal state related suitability by adding the calculated absolute values. The internal state related suitability can be calculated according to specific types of the internal state attributes as shown in Equation (3). In addition, the controller 100 calculates an absolute value of a difference between a behavior preference gain calculated a behavior preference classified for each internal state attribute and a corresponding internal state attribute-based behavior manifestation count occupancy ratio, for each internal state attribute, and calculates behavior decision related suitability by adding the calculated absolute values. The controller 100 calculates a reliability value of the currently selected robot genome by adding the internal state related suitability and the behavior decision related suitability and subtracting the addition result from a suitability constant in step 708. The controller 100 calculates reliability values of all robot genomes in the currently generated robot genome group by performing the process of FIG. 7 for the robot genomes.

FIG. 8 shows a process of modifying currently extracted robot genomes, i.e., parameters of specific genes when the currently extracted robot genomes are determined to be not suitable for user preferences in a robot genome generation system according to the present invention. In FIG. 8, an evolution calculation method or a neural network calculation method is assumed to be used as a modification method, wherein the evolution calculation method uses at least one of a general crossover calculation, an independent crossover calculation, a uniform crossover calculation, a building crossover calculation, and a mutation calculation.

Referring to FIG. 8, the controller 100 selects one of currently extracted robot genomes and selects a modification method of the selected robot genome in step 800. Since the robot genome generation system according to the present invention is assumed to use an evolution calculation method or a neural network calculation method, the controller 100 selects one of the two calculation methods according to a condition.

When the neural network calculation method is selected in step 800, the controller 100 updates the selected robot genome in the delta rule according to the neural network calculation method, i.e., a learning method of granting a weight case by case, in step 816. The gradient descent method may be used by replacing the delta rule. The controller 100 proceeds to step 800 to select another one of the extracted robot genomes.

When the evolution calculation method is selected in step 800, the controller 100 selects the mutation calculation or crossover calculation including the general crossover calculation, the independent crossover calculation, the uniform crossover calculation, and the building crossover calculation, as a modification method used to modify the selected robot genome, in step 802. The selection of the crossover calculation or the mutation calculation in the controller 100 can be accomplished according to the selection of the user or an arbitrarily set or pre-set condition.

If the mutation calculation is selected in step 802, the controller 100 modifies the selected robot genome using the mutation calculation in step 814. The mutation calculation is to modify at least one of genes of the selected robot genome, i.e., essential element related genes, internal state related genes, and behavior decision related genes, to an arbitrary value. When the mutation calculation of the selected robot genome is completed, the controller 100 proceeds to step 800 to select another one of the extracted robot genomes.

If the crossover calculation is selected in step 802, the controller 100 selects one of a general crossover calculation, an independent crossover calculation, a uniform crossover calculation, and a building crossover calculation in step 804. This selection can be accomplished according to the selection of the user or an arbitrarily set or pre-set condition.

Figures 9A, 9B:
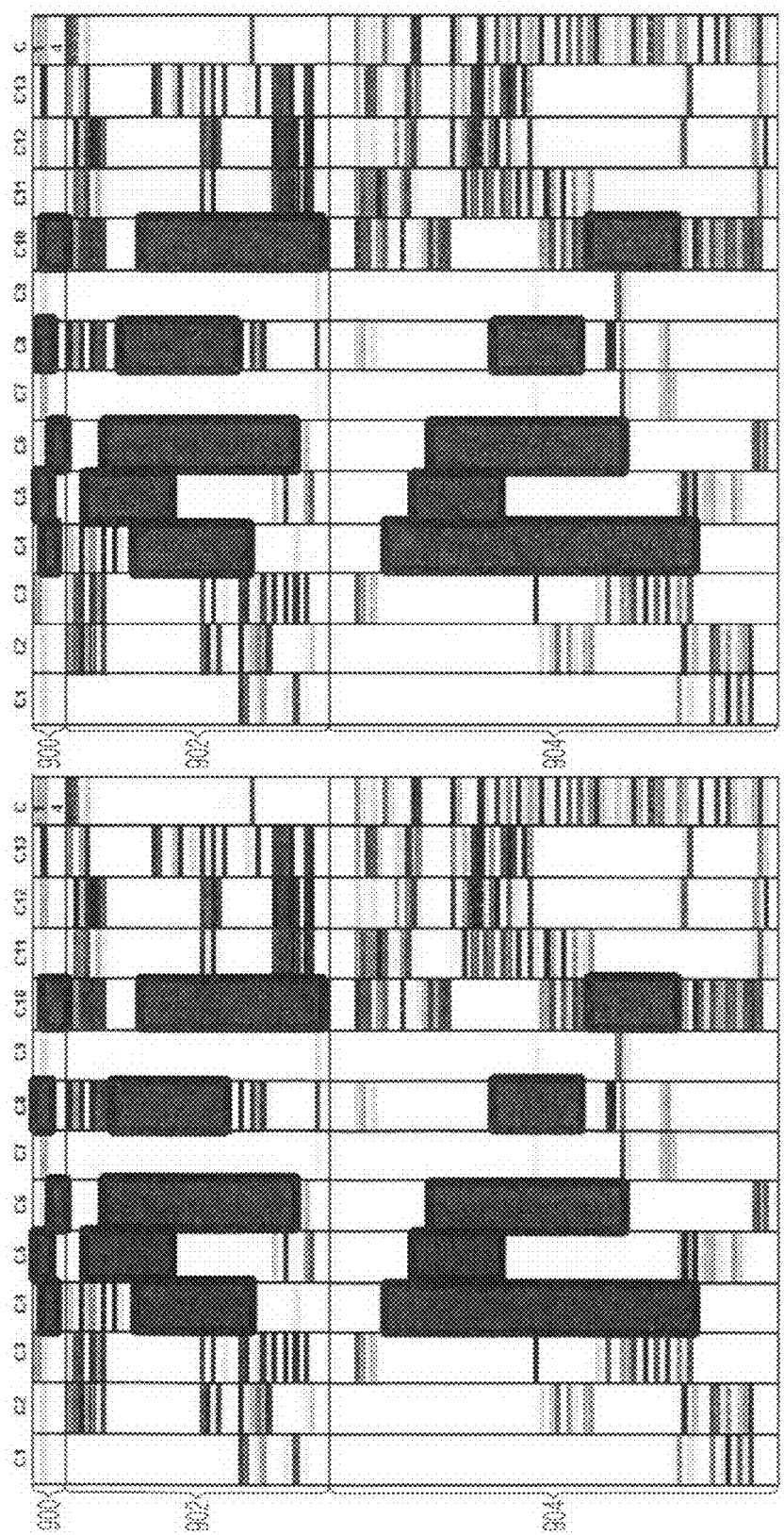
FIGS. 9A and 9B illustrate a general crossover calculation method among robot genome modification methods available in a robot genome generation system according to the present invention.

As described above, the general crossover calculation is a modification method in which a robot genome is modified by exchanging essential element related genes, internal state related genes, and behavior decision related genes according to a specific internal state with another robot genome. When the general crossover calculation is selected in step 804, the controller 100 further selects another one of the extracted robot genomes or one of the robot genomes of the current robot genome group and performs the general crossover calculation in step 806. FIGS. 9A and 9B illustrate the general crossover calculation method among robot genome modification methods available in a robot genome generation system according to the present invention.

FIG. 9A shows a robot genome to be modified and FIG. 9B shows a robot genome additionally selected to modify the robot genome to be modified. In a general crossover calculation, essential element related genes, internal state related genes, and behavior decision related genes related to arbitrarily selected internal states $c1 \sim c14$ are crossed over each other. For example, when internal states selected for the general crossover calculation are $c4, c5, c6, c8$, and $c11$, essential element related genes, internal state related genes, and behavior decision related genes corresponding to the internal states $c4, c5, c6, c8$, and $c11$ among essential element related genes 900, internal state related genes 902, and behavior decision related genes 904 of the robot genome to be modified are exchanged with essential element related genes, internal state related genes, and behavior decision related genes corresponding to the internal states $c4, c5, c6, c8$, and $c11$ of the additionally selected robot genome. When the general crossover calculation of the robot genome to be modified is completed, the controller 100 proceeds to step 800 to select another one of the extracted robot genomes and select a method to modify the selected robot genome.

As described above, an independent crossover calculation is a modification method in which a robot genome is modified by independently exchanging essential element related genes, internal state related genes, and behavior decision related genes according to a specific internal state with another robot genome. When the independent crossover calculation is selected in step 804, the controller 100 further selects another one of the extracted robot genomes or one of the robot genomes of the current robot genome group and performs the independent crossover calculation in step 808. FIGS. 10A and 10B illustrate the independent crossover calculation method among robot genome modification methods available in a robot genome generation system according to the present invention.

FIG. 10A shows a robot genome to be modified and FIG. 10B shows a robot genome additionally selected to modify the robot genome to be modified. In an independent crossover calculation, arbitrarily selected essential element related genes, arbitrarily selected internal state related genes, and arbitrarily selected behavior decision related genes, which are independent to the internal states $c1 \sim c14$, are crossed over each other. For example, when essential element related genes corresponding to the internal state $c4$, internal state related genes corresponding to the internal state $c5$, behavior decision related genes corresponding to the internal state $c6$, and a plurality of genes among essential element related genes 1000, internal state related genes 1002, and behavior decision related genes 1004 of the robot genome to be modified are selected for the independent crossover calculation, the selected genes are exchanged with essential element related genes corresponding to the internal state $c4$, internal state related genes corresponding to the internal state $c5$, behavior decision related genes corresponding to the internal state $c6$, and the plurality of selected genes of the additionally selected robot genome. When the independent crossover calculation of the robot genome to be modified is completed, the controller 100 proceeds to step 800 to select another one of the extracted robot genomes and select a method to modify the selected robot genome.

Figure 11A:
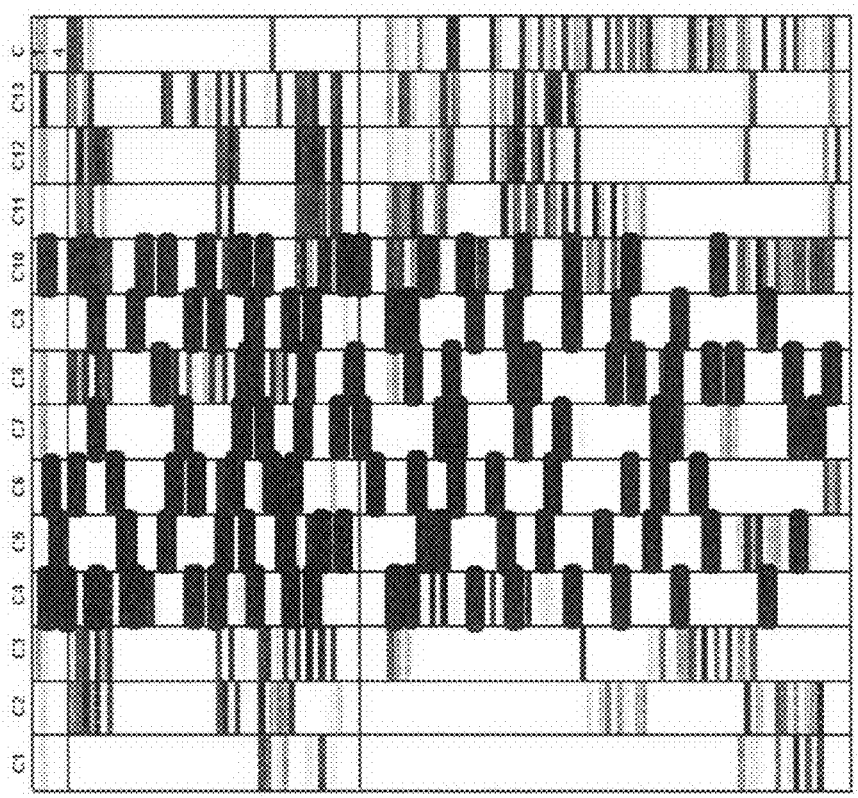
FIGS. 11A and 11B illustrate a uniform crossover calculation method among the robot genome modification methods available in a robot genome generation system according to the present invention.
Figure 11B:
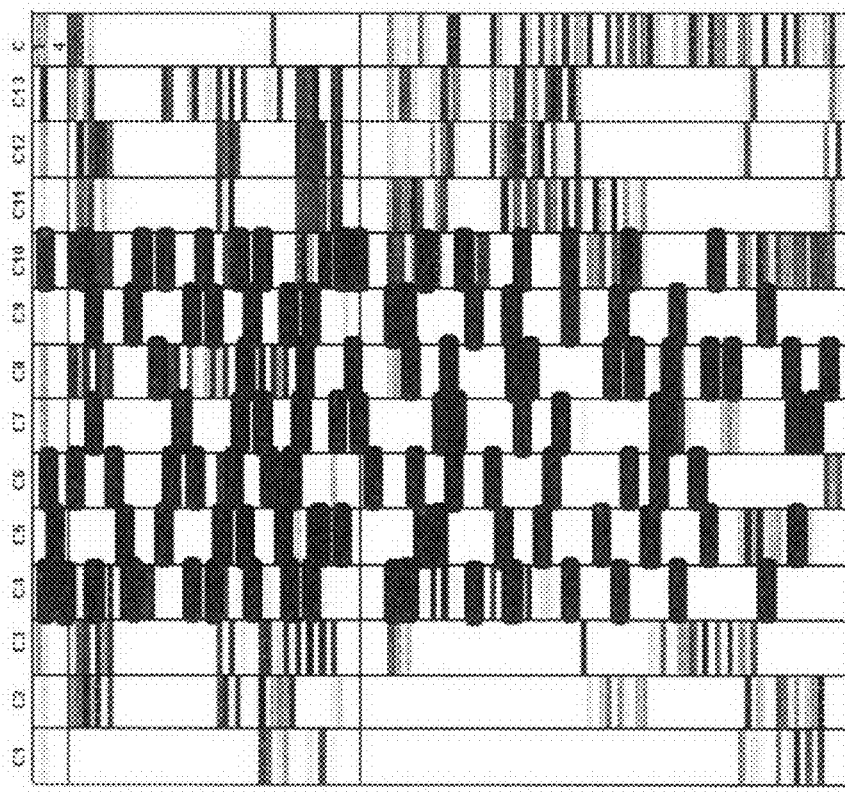

As described above, an uniform crossover calculation is a modification method in which a robot genome is modified by independently exchanging essential element related genes, internal state related genes, and behavior decision related genes with another robot genome regardless of specific internal states. When the uniform crossover calculation is selected in step 804, the controller 100 further selects another one of the extracted robot genomes or one of the robot genomes of the current robot genome group and performs the uniform crossover calculation in step 810. FIGS. 11A and 11B illustrate the uniform crossover calculation method among robot genome modification methods available in a robot genome generation system according to the present invention.

FIG. 11A shows a robot genome to be modified, and FIG. 11B shows a robot genome additionally selected to modify the robot genome to be modified. In a uniform crossover calculation, at least one of essential element related genes, internal state related genes, and behavior decision related genes related to a plurality of internal states among essential element related genes 1200, internal state related genes 1202, and behavior decision related genes 1204 are crossed over each other in an aggregate manner. For example, when behavior decision related genes corresponding to the internal state $c4$ and the manifested behavior 'looking around' of the robot genome to be modified are selected for the uniform crossover calculation, the selected genes are exchanged with behavior decision related genes corresponding to the internal state $c4$ and the manifested behavior 'looking around' of the additionally selected robot genome. After all arbitrarily selected genes are crossed over each other in the manner described above, the controller 100 determines that the uniform crossover calculation is completed, the controller 100 proceeds to step 800 to select another one of the extracted robot genomes and select a method to modify the selected robot genome.

Figures 12A, 12B:
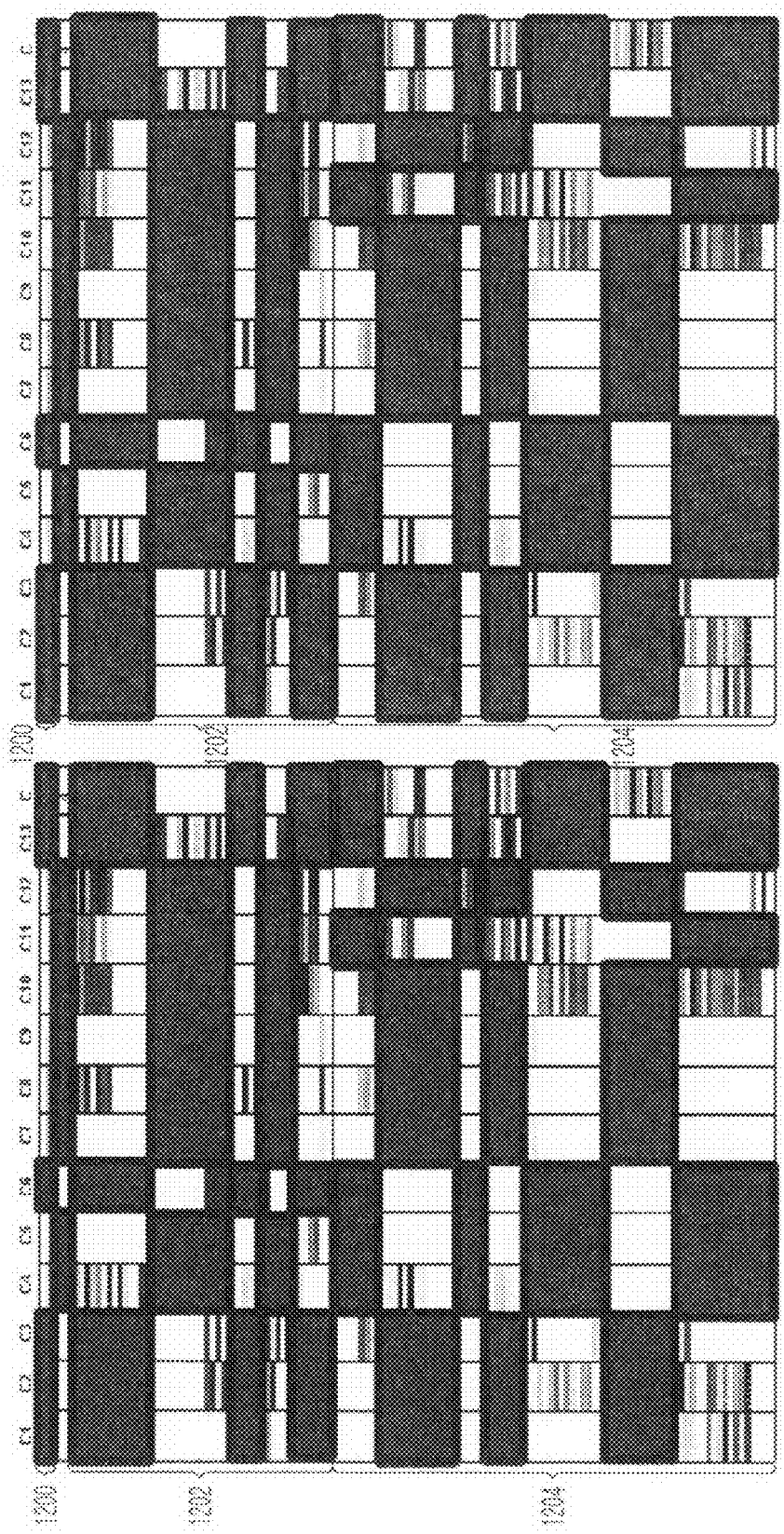
FIGS. 12A and 12B illustrate a building crossover calculation method among the robot genome modification methods available in a robot genome generation system according to the present invention.

As described above, a building crossover calculation is a modification method in which a robot genome is modified by exchanging specific essential element related genes, specific internal state related genes, and specific behavior decision related genes with another robot genome in an aggregate manner according to a plurality of internal states. If a building crossover calculation is selected in step 804, the controller 100 further selects another one of the extracted robot genomes or one of the robot genomes of the current robot genome group and performs the uniform crossover calculation in step 812. FIGS. 12A and 12B illustrate a building crossover calculation method among robot genome modification methods available in a robot genome generation system according to the present invention.

FIG. 12A shows a robot genome to be modified and FIG. 12B shows a robot genome additionally selected to modify the robot genome to be modified. In a building crossover calculation, regardless that genes selected for the uniform crossover calculation are essential element related genes, internal state related genes, or behavior decision related genes, arbitrarily selected genes are crossed over each other. For example, when essential element related genes corresponding to the internal states $c1$, $c2$, and $c3$ and an essential element 'initial value', internal state related genes corresponding to the internal states $c4$ and $c5$ and an external stimulus 'surprising', and behavior decision related genes corresponding to the internal states $c7$, $c8$, $c9$, and $c10$ and the manifested behavior 'looking around' of the robot genome to be modified are selected for the building crossover calculation, the selected genes are exchanged with essential element related genes corresponding to the internal states $c1$, $c2$, and $c3$ and an essential element 'initial value', internal state related genes corresponding to the internal states $c4$ and $c5$ and an external stimulus 'surprising', and behavior decision related genes corresponding to the internal states $c7$, $c8$, $c9$, and $c10$ and the manifested behavior 'looking around' of the additionally selected robot genome. When the building crossover calculation of the robot genome to be modified is completed, the controller 100 proceeds to step 800 to select another one of the extracted robot genomes and select a method to modify the selected robot genome.

In step 218 shown in FIG. 8, even when the modification of all the extracted robot genomes is completed, the process can be iteratively performed more than a number of times. When the iterative modification is performed, a new modification method can be selected regardless of a previously used modification method. For example, a robot genome modified using the independent crossover calculation method in a first modification can be modified using the neural network calculation method in a second modification. In this case, the modification methods can be arbitrarily selected.

Figure 13:
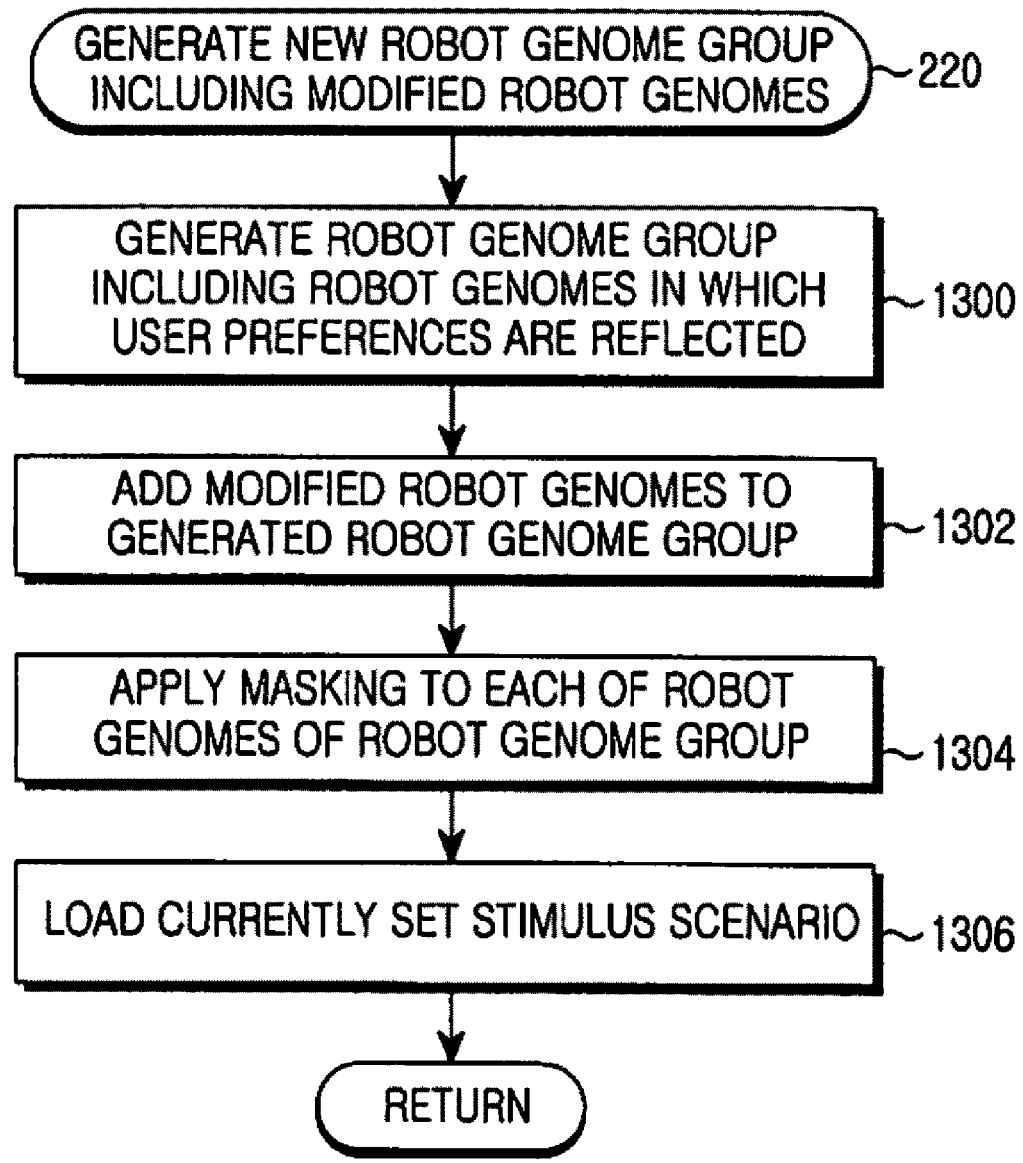
FIG. 13 is a flowchart of a process of generating a new robot genome group including modified robot genomes in a robot genome generation system according to the present invention.

FIG. 13 shows a process of generating a new robot genome group including modified robot genomes in a robot genome generation system according to the present invention. If the modification of the extracted robot genomes is completed is step 218 of FIG. 2, the controller 100 generates a new robot genome group including robot genomes reflecting the user preferences, which are received in step 202, i.e., a next generation robot genome group, in step 1300. The controller 100 adds the modified robot genomes to the new robot genome group in step 1302. The controller 100 performs the masking process for the each of robot genomes of the robot genome group including the modified robot genomes in step 1304. The controller 100 loads the currently set stimulus scenario in step 1306. Thereafter, the controller 100 manifests each of the robot genomes included in the robot genome group including the modified robot genomes according to the loaded stimulus scenario in step 210 of FIG. 2. The controller 100 determines by iteratively performing steps 212, 214, and 216 of FIG. 2 whether reliability values of the extracted robot genomes are within the reliable range, i.e., whether the extracted robot genomes are suitable for the user preferences.

If it is determined in step 216 that the extracted robot genomes are not suitable for the user preferences, the controller 100 iteratively performs steps 218, 220, and 210 through to 216. If it is determined in step 216 that the extracted robot genomes are suitable for the user preferences, the controller 100 selects one of the extracted robot genomes and outputs the selected robot genome to the robot platform of the user in step 222, and ends this robot genome generation process.

That is, although the initial values of the genes are determined by reflecting user preferences input by the user in the present invention, a robot genome more suitable for the user preferences input by the user may be generated by performing a global search for a plurality of robot genomes, which are continuously modified and arbitrarily generated. Thus, in this case, there occurs a difference between an initially generated robot genome and a robot genome output to be suitable for the user preferences.

Figure 14A:
FIG. 14A illustrates an initially generated robot genome in a robot genome generation system according to the present invention.
Figure 14B:
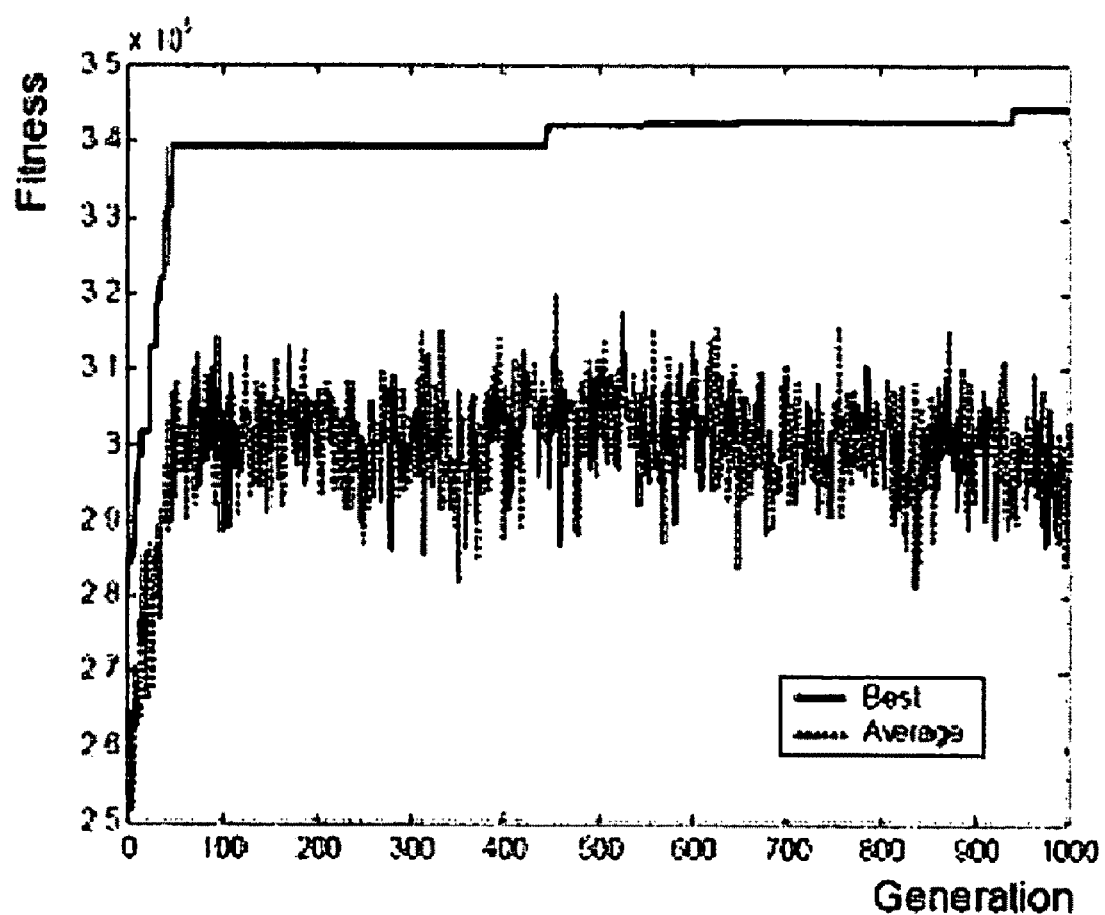
FIG. 14B illustrates a manifestation result of robot genome groups.

FIG. 14A shows an initially generated robot genome in a robot genome generation system according to the present invention, and FIG. 14B shows a manifestation result of robot genome groups. FIG. 14A shows an example of an initially generated robot genome in which user preferences are reflected. FIG. 14B shows an experimental result in which a reliability value is gradually converged to be suitable for the user preferences by continuously modifying robot genomes, manifesting each of a plurality of robot genomes and the modified robot genomes, and extracting robot genomes in the order closer to the user preferences according to a manifestation result, i.e., in the order from high to low reliability values. For example, although first generation robot genome groups, i.e., robot genome groups generated in an initial stage, do not reflect the user preferences, robot genomes suitable for the user preferences are gradually generated according to generations.

Figure 15:
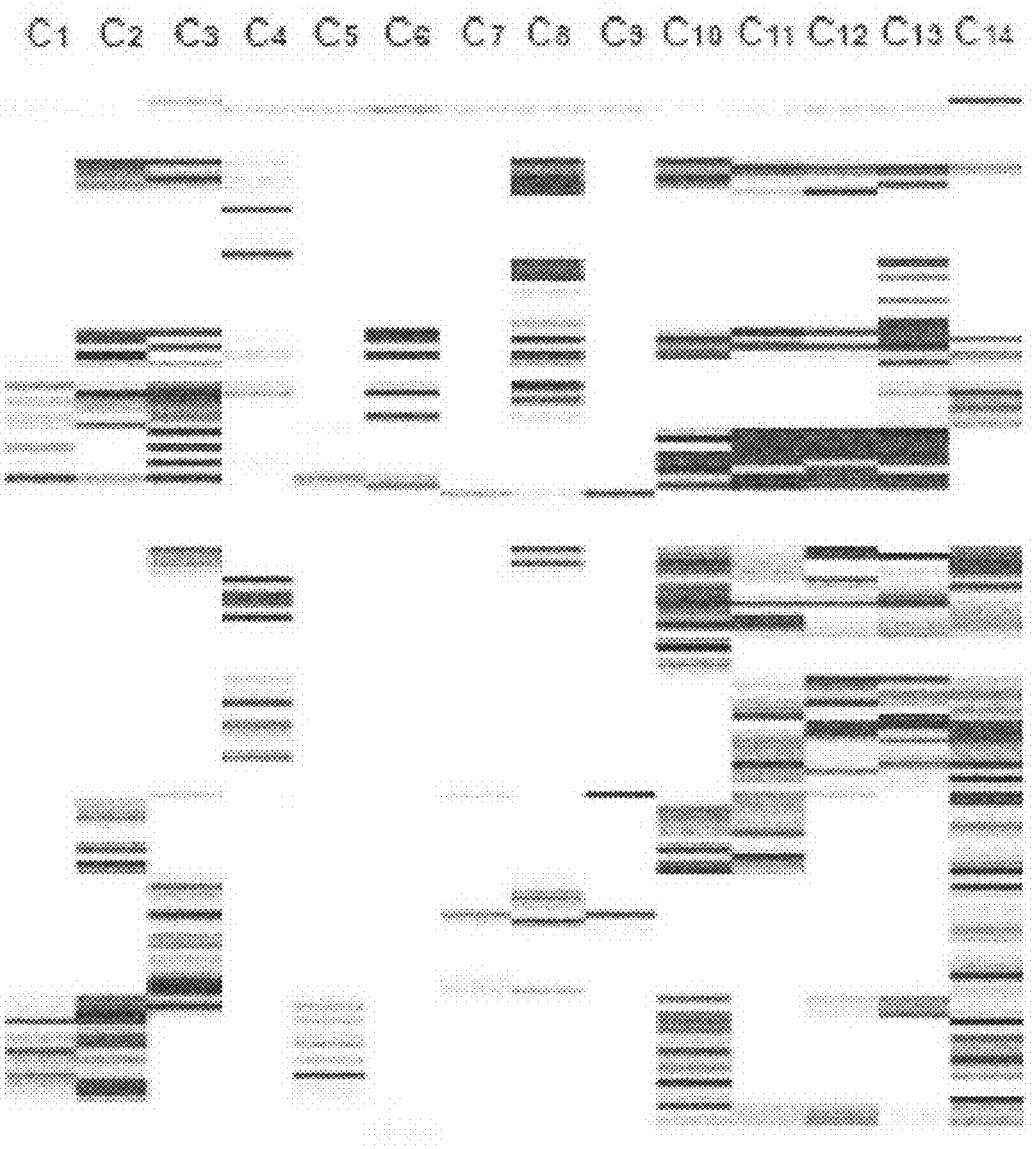
FIG. 15 illustrates robot genome satisfying user reliability.

FIG. 15 shows a robot genome satisfying user reliability, which is finally output according to the present invention. Among genes included in the robot genomes illustrated in FIGS. 14 and 15, dark colored genes are genes having a strong attribute, i.e., a large increasing or decreasing amount, and light colored genes are genes having a weak attribute, i.e., a small increasing or decreasing amount.

It can be shown that a plurality of genes illustrated in FIG. 15 are enhanced compared to genes illustrated in FIG. 14A. For example, although the internal states $c12$, $c13$, and $c14$ in the initial robot genome have weak attributes, the internal states $c12$, $c13$, and $c14$ in the final robot genome have stronger attributes than the attributes shown in FIG. 14A. The internal state $c3$ also have more enhanced attributes than attributes of the robot genome shown in FIG. 14A. Thus, a robot genome generated according to the present invention has a tendency similar to internal state attribute preferences and behavior preferences input by the user, and is closer to user preferences input by the user and more robust to even various stimuli compared to a robot genome generated by a conventional simple initialization.

As described above, according to the present invention, when a robot genome of a genetic robot is generated, a user can more easily generate the robot genome, and the user can rely that the generated robot genome has the personality desired by the user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of generating robot genome, the method comprising:

a user preference receiving process, wherein user preferences are received from a user, the user preferences including internal state attribute preferences of internal state attributes according to external stimuli and behavior preferences distinguished according to the internal state attributes;

a robot genome group generating process, wherein a robot genome group is generated, the robot genome group including a plurality of robot genomes containing initial values of internal state related genes generated by reflecting the internal state attribute preferences, initial values of behavior decision related genes generated by reflecting the behavior preferences, and initial values of essential element related genes determined according to conditions;

a masking process, wherein internal state related genes and behavior decision related genes manifested with respect to external stimuli and manifested behaviors are determined from among the genes by applying a masking table to each of the plurality of robot genomes, and a determination is made whether manifestation attributes of the genes determined to manifest are positive or negative;

a manifesting process, wherein each of the robot genomes is manifested according to a stimulus scenario for testing whether the robot genomes are suitable for the input user preferences, and manifestation results of the robot genomes according to the stimulus scenario are output;

a suitability determining process, wherein a reliability value of each robot genome is determined by receiving the manifestation results according to the stimulus scenario and the robot genomes, and a determination is made whether reliability values of robot genomes extracted from the robot genome group are suitable for the user preferences;

a modifying process, wherein the extracted robot genomes are modified according to a modification method when the reliability values of the extracted robot genomes are not suitable for the user preferences according to a determination result in the suitability determining process;

a secondary robot genome group generating process, wherein a new robot genome group is generated, which includes a plurality of new robot genomes in which the internal state attribute preferences and the behavior preferences are reflected and the modified robot genomes; and an iterating process, wherein the masking process, the manifesting process, and the suitability determining process are iteratively performed for the secondary robot genome group, and the modifying process and the secondary robot genome group generating process are iteratively performed according to a result in the suitability determining process.

2. The method of claim 1, wherein the user preference receiving process comprises:
generating a Graphic User Interface (GUI) containing an input menu for receiving the internal state attribute preferences and an input menu for receiving the behavior preferences; and
receiving the internal state attribute preferences and the behavior preferences using the GUI.

3. The method of claim 1, wherein the robot genome group generating process comprises:
an initial value setting process, wherein the initial values of the internal state related genes, which are parameters of internal state attributes with respect to external stimuli, and the initial values of the behavior decision related genes, which are parameters of internal state attributes with respect to manifested behaviors, are set according to the internal state attribute preferences and the behavior preferences;
an essential element related gene generating process, wherein the initial values of the essential element related genes, which are parameters of essential elements related to the internal state attributes, are set;
a robot genome generating process, wherein a robot genome containing the internal state related genes, the behavior decision related genes, and the essential element related genes is generated; and
an iterative robot genome generating process, wherein a determination is made whether the number of currently generated robot genomes is a particular number, and the initial value setting process, the essential element related gene generating process, and the robot genome generating process are iteratively performed when the number of currently generated robot genomes is less than the particular number.

4. The method of claim 1, wherein the masking process comprises each gene of each of the robot genomes included in the robot genome group is multiplied by a corresponding value of a masking table.

5. The method of claim 4, wherein in the masking table, each internal state attribute of the robot genome has a masking value of 0 when the internal state attribute is not manifested according to specific external stimuli and specifically manifested behaviors, or +1 or −1 when the internal state attribute is manifested according to any of specific external stimuli and specifically manifested behaviors.

6. The method of claim 5, wherein the masking values are experientially set according to customary values generally acknowledged by social members.

7. The method of claim 1, wherein the manifesting process comprises:
a stimulus scenario setting loading process, wherein one of stimulus scenarios is loaded; and
a robot genome manifesting process, wherein each of the robot genomes included in the robot genome group is manifested according to settings of the loaded stimulus scenario.

8. The method of claim 7, wherein the stimulus scenario setting loading process comprises:
a stimulus scenario generation window displaying process, wherein when the user selects generation of a stimulus scenario, displaying a stimulus scenario generation window;
a stimulus scenario setting process, wherein settings of the stimulus scenario are modified according to setting values input by the user by means of the stimulus scenario generation window; and
a loading process, wherein the stimulus scenario modified by the user is loaded.

9. The method of claim 8, wherein the stimulus scenario generation window contains a menu for setting types of stimuli contained in the stimulus scenario, a manifestation frequency of each stimulus, and a lasting time of each stimulus.

10. The method of claim 1, wherein the suitability determining process further comprises an outputting process, wherein one of the extracted robot genomes is output when the reliability values of the extracted robot genomes are suitable for the user preferences.

11. The method of claim 1, wherein the suitability determining process comprises:
an internal state attribute occupancy ratio calculating process, wherein an internal state attribute occupancy ratio, which is a ratio of an integral value of each internal state attribute to a sum of integral values of all internal state attributes during the stimulus scenario, is calculated with respect to a manifestation result of each robot genome;
a behavior manifestation count occupancy ratio calculating process, wherein an internal state attribute-based behavior manifestation count occupancy ratio, which is a ratio of a number of behavior manifestations classified for each internal state attribute to a sum of numbers of behavior manifestations classified for all internal state attributes during the stimulus scenario, is calculated with respect to a manifestation result of each robot genome;
an internal state attribute preference gain calculating process, wherein an internal state attribute preference gain, which is a ratio of an internal state attribute preference according to a specific internal state attribute to a sum of the internal state attribute preferences, is calculated for each internal state attribute;
a behavior preference gain calculating process, wherein a behavior preference gain, which is a ratio of a behavior preference according to a specific internal state attribute to a sum of the behavior preferences, is calculated for each internal state attribute;
a reliability value calculating process, wherein an absolute value of a difference between an internal state attribute preference gain and an internal state attribute occupancy ratio corresponding to the internal state attribute preference gain, is calculated for each internal state attribute, an absolute value of a difference between a behavior preference gain and an internal state attribute-based behavior manifestation count occupancy ratio corresponding to the behavior preference gain, is calculated for each internal state attribute, and a reliability value of each robot genome is calculated by adding all the absolute values;
a robot genome extracting process, wherein a number of robot genomes are extracted using the calculated reliability values; and
a determining process, wherein a determination is made whether reliability values of the extracted robot genomes are suitable for the user preferences.

12. The method of claim 11, wherein the internal state attribute preference gain is determined by the equation $$\varphi_k^l = \psi_k^l \Big/ \sum_{l=1}^{14} \psi_l^l,$$

where $\phi_k^I$ denotes an internal state attribute preference gain of a $k^{th}$ internal state, $\psi_k^I$ denotes an internal state attribute preference of the $k^{th}$ internal state, and $$\sum_{l=1}^{14} \psi_l^I$$

denotes a sum of all internal state attribute preferences.

13. The method of claim 11, wherein the behavior preference gain is determined by the equation $$\varphi_k^B = \psi_k^B / \sum_{l=1}^{14} \psi_l^B,$$

where $\phi_k^B$ denotes a behavior preference gain of a $k^{th}$ internal state, $\psi_k^B$ denotes a behavior preference of the $k^{th}$ internal state, and $$\sum_{l=1}^{14} \psi_l^B$$

denotes a sum of all behavior preferences.

14. The method of claim 11, wherein the suitability determining process comprises:
an internal state type classifying process, wherein the internal state attributes are classified according to types;
an internal state attribute type adding process, wherein a sum of absolute values of a difference between an internal state attribute preference gain and an internal state attribute occupancy ratio of each of state attributes is calculated for each type of the internal state attributes;
a behavior manifestation adding process, wherein a sum of absolute values of a difference between a behavior preference gain and an internal state attribute-based behavior manifestation count occupancy ratio is calculated for each internal state attribute; and
a calculating process, wherein a reliability value is calculated by adding the addition result of the internal state attribute type adding process and the addition result of the behavior manifestation adding process.

15. The method of claim 14, wherein the suitability determining process comprises calculating a reliability value and determining whether the extracted robot genomes are suitable for the user preferences using equation $$\Phi(j\Delta T, g) = C - \rho \begin{bmatrix} \sum_{k=1}^{6}(1/\varphi_k^I)|\varphi_k^I - \Phi_{pk}^M(j\Delta T, g)| + \\ \sum_{k=7}^{9}(1/\varphi_k^I)|\varphi_k^I - \Phi_{pk}^H(j\Delta T, g)| + \\ \sum_{k=10}^{14}(1/\varphi_k^I)|\varphi_k^I - \Phi_{pk}^E(j\Delta T, g)| + \\ \sum_{k=1}^{14}(1/\varphi_k^B)|\varphi_k^B - \Phi_{fk}^{BG}(j\Delta T, g)| \end{bmatrix},$$

where $1/\phi_k^I$ denotes a weight of a $k^{th}$ internal state and a value to expedite the convergence of an occupancy ratio of a $k^{th}$ internal state integral value, C denotes the suitability constant, $\rho$ denotes a scaling factor for a percentage calculation, $$\sum_{k=1}^{6}(1/\varphi_k^I)|\varphi_k^I - \Phi_{pk}^M(j\Delta T, g)|$$

is used to obtain a sum of absolute values of a difference between an internal state attribute preference gain and an internal state attribute occupancy ratio of each of internal states corresponding to 'motivation' among all internal state attributes, $\phi k^I$ denotes an internal state attribute preference gain of a $k^{th}$ internal state attribute among the internal state attributes belonging to 'motivation', $\Phi_{pk}^M(j\Delta T,g)$ denotes an internal state attribute occupancy ratio of a $k^{th}$ internal state among the internal state attributes belonging to 'motivation', $$\sum_{k=7}^{9}(1/\varphi_k^I)|\varphi_k^I - \Phi_{pk}^H(j\Delta T, g)|$$

is used to obtain a sum of absolute values of a difference between an internal state attribute preference gain and an internal state attribute occupancy ratio of each of internal states corresponding to 'homeostasis' among all internal state attributes, $\phi_k^I$ denotes an internal state attribute preference gain of a $k^{th}$ internal state attribute among the internal state attributes belonging to 'homeostasis', $\Phi_{pk}^H(j\Delta T,g)$ denotes an internal state attribute occupancy ratio of the $k^{th}$ internal state among the internal state attributes belonging to 'homeostasis', $$\sum_{k=10}^{14}(1/\varphi_k^I)|\varphi_k^I - \Phi_{pk}^E(j\Delta T, g)|$$

is used to obtain a sum of absolute values of a difference between an internal state attribute preference gain and an internal state attribute occupancy ratio of each of internal states corresponding to 'emotion' among all internal state attributes, $\phi_k^I$ denotes an internal state attribute preference gain of a $k^{th}$ internal state attribute among the internal state attributes belonging to 'emotion', $\Phi_{pk}^E(j\Delta T,g)$ denotes an internal state attribute occupancy ratio of the $k^{th}$ internal state among the internal state attributes belonging to 'emotion', $$\sum_{k=1}^{14}(1/\varphi_k^B)|\varphi_k^B - \Phi_{fk}^{BG}(j\Delta T, g)|$$

is used to obtain a sum of absolute values of a difference between a behavior preference gain and an internal state attribute-based behavior manifestation count occupancy ratio, for each internal state attribute, $\phi_k^B$ denotes a behavior preference gain classified for a $k^{th}$ internal state attribute among the internal state attributes, and $\Phi_{fk}^{BG}(j\Delta T,g)$ denotes an internal state attribute-based behavior manifestation count occupancy ratio of the $k^{th}$ internal state among the internal state attributes.

16. The method of claim 11, wherein the determining process comprises determining whether the extracted robot genomes are suitable for the user preferences according to whether reliability values of the extracted robot genomes are within a reliable range.

17. The method of claim 16, wherein the determining process comprises determining whether all the reliability values of the extracted robot genomes are within the reliable range or whether a representative value of the reliability values of the extracted robot genomes is within the reliable range.

18. The method of claim 11, wherein the suitability determining process further comprises an outputting process, wherein one of the extracted robot genomes is output when the reliability values of the extracted robot genomes are suitable for the user preferences.

19. The method of claim 1, wherein the modifying process comprises:
 a robot genome selecting process, wherein one of the robot genomes is selected;
 a modification method selecting process, wherein one of evolution calculation or neural network calculation is selected; and
 a robot genome modifying process, wherein the selected robot genome is modified using the selected modification method.

20. The method of claim 19, wherein the evolution calculation is one or an aggregation of mutation calculation, general crossover calculation, independent crossover calculation, uniform crossover calculation, and building crossover calculation.

21. The method of claim 19, wherein the modification method selecting process comprises selecting one of the mutation calculation, the general crossover calculation, the independent crossover calculation, the uniform crossover calculation, the building crossover calculation, and the neural network calculation.

22. The method of claim 19, wherein the modifying process further comprises an iterative modifying process, wherein the robot genome selecting process, the modification method selecting process, and the robot genome modifying process are iteratively performed a number of times when the modification of all the input robot genomes is completed.

23. The method of claim 1, wherein the secondary robot genome group generating process comprises;
 a robot genome regenerating process, wherein robot genomes in which the internal state attribute preferences and the behavior preferences are reflected are regenerated;
 a secondary robot genome number checking process, wherein a determination is made whether a sum of a number of regenerated robot genomes and a number of robot genomes modified in the modifying process is less than a particular number;
 a robot genome regenerating iteration process, wherein the robot genome regenerating process is repeated when a determination is made that the sum is less than the particular number; and
 a generating process, wherein these robot genomes are generated as a secondary robot genome group when the sum is determined to be equal to the particular number.

24. A system for generating a robot genome, the system comprising:
 a controller provided with a working memory for storing data and configured to control:
 an initial value generator for generating gene parameter values affecting an internal state change and an outwardly manifested behavior, the gene parameter values forming a unique genetic code;
 a user preference input unit for receiving user preferences related to the internal state change and the outwardly manifested behavior; and
 a masking unit for applying the gene parameter values to a masking value used for determining whether attributes of the internal state change and the outwardly manifested behavior are positive or negative;
 wherein the controller reflects the gene parameter values generated by the initial value generator to the user preferences received by the user preference input unit and the controller applies the reflected gene parameter values to the masking value.

25. The system of claim 24, wherein the controller is further configured to control:
 a manifestation unit for manifesting the genetic codes using predetermined stimulus scenarios, calculating manifestation results of genetic codes;
 a suitability determiner for determining whether the genetic codes are reliable;
 wherein the controller controls by extracting a predetermined number of the genetic codes according to manifestation results calculated by the manifestation unit, outputting the extracted genetic codes when the extracted genetic codes are reliable according to determination results of the genetic codes.

26. The system of claim 25, wherein the controller modifies the genetic codes according to a preset modification method when the extracted genetic codes are not reliable, and the controller iteratively performs the manifesting process, the calculating process and the determining process.

27. The system of claim 26, wherein the genetic codes include a plurality of internal state related genes, behavior decision related genes, and essential element related genes.

28. The system of claim 24, wherein the masking value has a masking value of 0 when the internal state attribute is not manifested according to at least one external stimuli, or +1 or −1 when the internal state attribute is manifested.

29. The system of claim 28, wherein the masking value is experientially set according to customary values generally acknowledged by social members.

30. The system of claim 25, wherein the suitability determiner calculates reliability values of the extracted genetic codes, determines whether the reliability values of the extracted genetic codes are within a predetermined reliable range.

31. The system of claim 26, wherein the controller modifies the genetic codes using one of an evolution calculation and a neural network calculation.

32. The system of claim 29, wherein the evolution calculation is one of a mutation calculation, a general crossover calculation, an independent crossover calculation, a uniform crossover calculation, and a building crossover calculation.

* * * * *